United States Patent
Iwata et al.

(10) Patent No.: US 8,982,422 B2
(45) Date of Patent: Mar. 17, 2015

(54) METHOD AND APPARATUS FOR FORMING IMAGES, AND METHOD FOR PRODUCING PRINTED PRODUCTS

(71) Applicants: Muneaki Iwata, Kanagawa (JP);
Masaaki Ishida, Kanagawa (JP);
Atsufumi Omori, Kanagawa (JP);
Hayato Fujita, Kanagawa (JP)

(72) Inventors: Muneaki Iwata, Kanagawa (JP);
Masaaki Ishida, Kanagawa (JP);
Atsufumi Omori, Kanagawa (JP);
Hayato Fujita, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/269,332

(22) Filed: May 5, 2014

(65) Prior Publication Data
US 2014/0333941 A1 Nov. 13, 2014

(30) Foreign Application Priority Data
May 10, 2013 (JP) .................................. 2013-100139

(51) Int. Cl.
*H04N 1/407* (2006.01)
*G03G 15/04* (2006.01)

(52) U.S. Cl.
CPC .............................. *G03G 15/04027* (2013.01)
USPC .......... 358/3.27; 358/3.06; 358/474; 358/1.9; 347/135; 347/224; 347/253; 399/31; 399/32; 399/50; 399/52

(58) Field of Classification Search
CPC combination set(s) only.
See application file for complete search history.

(56) References Cited

U.S. PATENT DOCUMENTS

| | | | |
|---|---|---|---|
| 5,973,709 A | 10/1999 | Tanuma et al. | |
| 6,388,689 B1 * | 5/2002 | Toda et al. | 347/132 |
| 6,643,031 B1 | 11/2003 | Takano et al. | |
| 7,106,964 B2 * | 9/2006 | Yokota et al. | 396/563 |
| 7,206,013 B2 * | 4/2007 | Sumi et al. | 347/236 |
| 7,315,315 B2 * | 1/2008 | Lee et al. | 347/131 |
| 7,675,532 B2 * | 3/2010 | Iida et al. | 347/132 |

(Continued)

FOREIGN PATENT DOCUMENTS

| | | |
|---|---|---|
| DE | 10 2007 002 211 A1 | 8/2007 |
| JP | 2004-282344 | 10/2004 |

(Continued)

OTHER PUBLICATIONS

Extended European Search Report issued Sep. 19, 2014, in European Patent Application No. 14167390.5.

(Continued)

*Primary Examiner* — Dung Tran
(74) *Attorney, Agent, or Firm* — Oblon, McClelland, Maier & Neustadt, L.L.P.

(57) ABSTRACT

An image forming apparatus for forming an image in accordance with light to be emitted from a light source includes: a digital half-toning unit configured to convert a uniform-pixel-value region of image data to a parallel-line pattern formed with a plurality of parallel lines extending obliquely with respect to a direction, in which pixels are arrayed, thereby expressing each gray level of the image data as an area percentage; a modulated-signal generating unit configured to generate a modulated signal by modulating the converted image data with a clock signal; a light-source driving unit configured to drive the light source according to the modulated signal; and an edge control unit configured to narrow a to-be-illuminated region, which is to be illuminated by the light from the light source, in each of edge neighborhoods of the lines constituting the parallel-line pattern, while increasing intensity of the light.

12 Claims, 19 Drawing Sheets

(56) References Cited

U.S. PATENT DOCUMENTS

| | | |
|---|---|---|
| 8,212,847 B2 * | 7/2012 | Kella et al. .................. 347/131 |
| 2003/0025785 A1 | 2/2003 | Nihei et al. |
| 2004/0183891 A1 | 9/2004 | Ishida et al. |
| 2005/0089069 A1 | 4/2005 | Ozasa et al. |
| 2005/0116666 A1 | 6/2005 | Shimizu et al. |
| 2005/0146596 A1 | 7/2005 | Nihei et al. |
| 2005/0243163 A1 | 11/2005 | Ozasa et al. |
| 2006/0012704 A1 | 1/2006 | Shimizu et al. |
| 2006/0285186 A1 | 12/2006 | Ishida et al. |
| 2007/0091163 A1 | 4/2007 | Omori et al. |
| 2007/0132828 A1 | 6/2007 | Ishida et al. |
| 2008/0088893 A1 | 4/2008 | Ishida et al. |
| 2008/0123160 A1 | 5/2008 | Omori et al. |
| 2008/0225106 A1 | 9/2008 | Omori et al. |
| 2008/0239336 A1 | 10/2008 | Tanabe et al. |
| 2008/0291259 A1 | 11/2008 | Nihei et al. |
| 2008/0298842 A1 | 12/2008 | Ishida et al. |
| 2009/0091805 A1 | 4/2009 | Tanabe et al. |
| 2009/0303451 A1 | 12/2009 | Miyake et al. |
| 2010/0045767 A1 | 2/2010 | Nihei et al. |
| 2010/0214637 A1 | 8/2010 | Nihei et al. |
| 2011/0199657 A1 | 8/2011 | Ishida et al. |
| 2011/0228037 A1 | 9/2011 | Omori et al. |
| 2011/0304683 A1 | 12/2011 | Ishida et al. |
| 2012/0099165 A1 | 4/2012 | Omori et al. |
| 2012/0120454 A1 | 5/2012 | Igawa |
| 2012/0189328 A1 | 7/2012 | Suzuki et al. |
| 2012/0293783 A1 | 11/2012 | Ishida et al. |
| 2013/0033558 A1 | 2/2013 | Akatsu et al. |
| 2013/0243459 A1 | 9/2013 | Omori et al. |
| 2013/0302052 A1 | 11/2013 | Iwata et al. |

FOREIGN PATENT DOCUMENTS

| | | |
|---|---|---|
| JP | 4026271 | 12/2007 |
| JP | 4912071 | 4/2012 |

OTHER PUBLICATIONS

U.S. Appl. No. 14/072,946, filed Nov. 6, 2013.
U.S. Appl. No. 14/193,271, filed Feb. 28, 2014.
U.S. Appl. No. 14/082,628, filed Nov. 18, 2013.
U.S. Appl. No. 14/140,147, filed Dec. 24, 2013.

* cited by examiner

METHOD AND APPARATUS FOR FORMING IMAGES, AND METHOD FOR PRODUCING PRINTED PRODUCTS

CROSS-REFERENCE TO RELATED APPLICATIONS

The present application claims priority to and incorporates by reference the entire contents of Japanese Patent Application No. 2013-100139 filed in Japan on May 10, 2013.

BACKGROUND OF THE INVENTION

1. Field of the Invention

The present invention relates generally to methods and apparatuses for forming images, and methods for producing printed products.

2. Description of the Related Art

Digital electrophotographic printers have come into wide use in the field of production printing in recent years. Accordingly, there is a demand for an increase in image quality and reliability of digital electrophotographic printers. In particular, there is a strong demand that digital printers be increased in uniformity of gray levels.

A digital electrophotographic printer typically includes an image processing unit which performs image processing on image data to correct and thereby increase image quality. An image processing unit may perform image processing on multi-bit image data of high resolution of 1,200 dots per inch (dpi) or 2,400 dpi, for example.

Such a digital electrophotographic printer typically includes: a photosensitive drum of which photosensitive surface functions as a surface to be scanned; a light source which emits laser light; a polygon mirror which deflects the laser light emitted from the light source; and a scanning optical system which causes the laser light deflected by the polygon mirror to impinge on the surface (the surface to be scanned) of the photosensitive drum. The digital electrophotographic printer may form an electrostatic latent image representing image data on the photosensitive drum by modulating a light beam emitted from the light source according to the image data, illuminating the surface to be scanned with the light beam from the light source, and scanning the light beam across the surface to be scanned.

A digital electrophotographic printer configured as described above typically employs a device, such as a laser diode array (LDA) or a vertical-cavity surface-emitting laser (VCSEL), having a plurality of light emitters as the light source. Employment of such a device allows the digital electrophotographic printer to form an electrostatic latent image of a resolution of, for example, 2,400 dpi or 4,800 dpi, higher than that of 1,200-dpi image data.

There can be a situation in which an image processing unit of a digital printer applies, as digital half-toning, parallel-line dithering which replaces each uniform-gray-level region (put another way, region of a same pixel value) of image data with a parallel-line pattern. Each width of lines constituting the parallel-line pattern varies depending on the pixel value, so that each gray level is expressed as an area percentage.

For example, Japanese Laid-open Patent Application No. 2004-282344 discloses a technique, in which an image processing unit suppresses image noise without changing screen ruling by generating a binary parallel-line pattern by digital half-toning, increasing resolution of the parallel-line pattern, and thereafter performing interpolation and smoothing. Japanese Patent No. 4026271 discloses a technique which increases image quality by increasing resolution by dividing pixels of an image into subpixels, and smoothing edge portions of the image.

Meanwhile, when a parallel-line pattern is high in line density, an electrostatic latent image of the pattern formed on a photosensitive drum can have a region where electric field intensity is weak due to an influence exerted from an adjacent line or the like. This is undesirable because, in such a region, toner sticks to the photosensitive drum less reliably.

Edges of lines of a parallel-line pattern representing low-resolution image data have a shape (stepped profile) assuming a large-step staircase. For this reason, when a highly-dense parallel-line pattern of low-resolution image data is formed on a photosensitive drum, a weak electric-field region can be produced particularly at a stepped profile portion where lines of the pattern are close to each other. In the weak electric-field region, toner can undesirably unevenly stick to the photosensitive drum or be scattered between the lines. Accordingly, it has been difficult for digital printers to form an image of uniform gray levels from low-resolution image data to which parallel-line dithering is applied.

Under the circumstances described above, there is a need for methods and apparatuses for forming images, and methods for producing printed products with parallel-line patterns with uniform gray levels.

It is an object of the present invention to at least partially solve the problem in the conventional technology.

SUMMARY OF THE INVENTION

It is an object of the present invention to at least partially solve the problems in the conventional technology.

According to the present invention, there is provided an image forming apparatus for forming an image in accordance with light caused to be emitted from a light source, the image forming apparatus comprising: a digital half-toning unit configured to convert a uniform-pixel-value region formed with pixels having a same pixel value of image data to a parallel-line pattern formed with a plurality of parallel lines extending obliquely with respect to a direction, in which pixels are arrayed, thereby expressing each gray level of the image data as an area percentage; a modulated-signal generating unit configured to generate a modulated signal by modulating the image data, in which each gray level is expressed as an area percentage, with a clock signal; a light-source driving unit configured to drive the light source according to the modulated signal; and an edge control unit configured to narrow a to-be-illuminated region, the to-be-illuminated region being to be illuminated by light to be emitted from the light source, in each of edge neighborhoods of the plurality of lines constituting the parallel-line pattern while increasing intensity of the light to be emitted from the light source.

The present invention also provides an image forming method for forming an image in accordance with light emitted from a light source, the image forming method comprising: performing digital half-toning by converting a uniform-pixel-value region of image data to a parallel-line pattern formed with a plurality of parallel lines extending obliquely with respect to a direction, in which pixels are arrayed, thereby expressing each gray level of the image data as an area percentage; performing edge control by narrowing a to-be-illuminated region, the to-be-illuminated region being to be illuminated by light to be emitted from the light source, in each of edge neighborhoods of the plurality of lines constituting the parallel-line pattern while increasing intensity of the light to be emitted from the light source; generating a modulated signal by modulating the image data, in which each gray level is expressed as an area percentage, with a clock signal; and driving the light source according to the modulated signal.

The present invention also provides a method for producing a printed product, the method comprising: performing digital half-toning by converting a uniform-pixel-value region of image data to a parallel-line pattern formed with a plurality of parallel lines extending obliquely with respect to a direction, in which pixels are arrayed, thereby expressing each gray level of the image data as an area percentage; performing edge control by narrowing a to-be-illuminated region, the to-be-illuminated region being to be illuminated by light to be emitted from a light source, in each of edge neighborhoods of the plurality of lines constituting the parallel-line pattern while increasing intensity of the light to be emitted from the light source; generating a modulated signal by modulating the image data, in which each gray level is expressed as an area percentage and of which number of gray levels is reduced, with a clock signal; forming an electrostatic latent image on a latent-image carrier with light from the light source by driving the light source according to the modulated signal; causing toner to stick to the electrostatic latent image formed on the latent-image carrier; and transferring the toner onto a medium, thereby producing a printed product.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
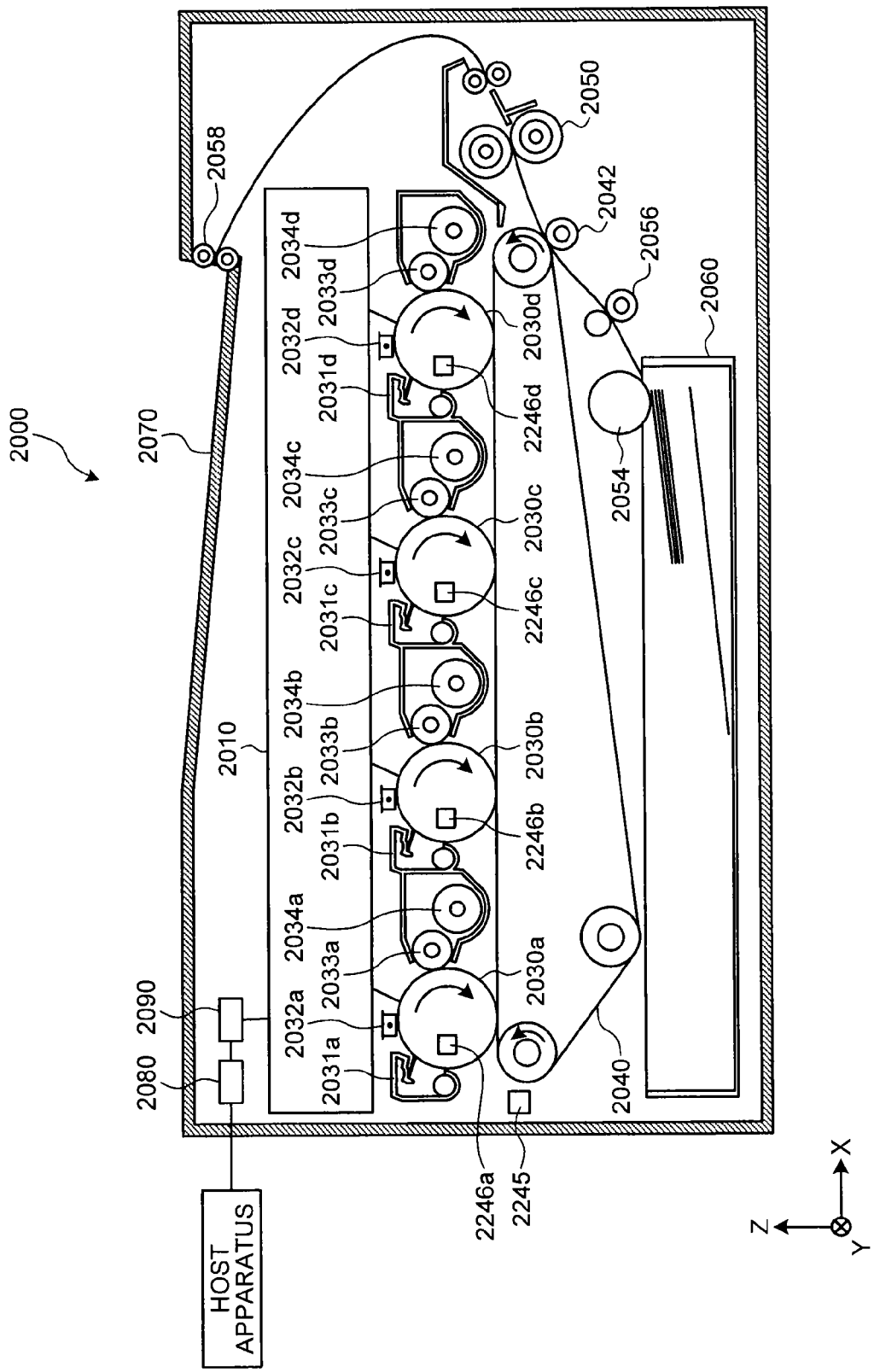
FIG. 1 is a diagram of a schematic configuration of a color printer according to an embodiment of the present invention.

FIG. 1 is a diagram of a schematic configuration of a color printer 2000 according to an embodiment of the present invention. The color printer 2000 produces a printed product by transferring toner onto a sheet of recording paper (medium) (hereinafter, "recording sheet"). The color printer 2000 is a tandem full-color printer which forms a full-color image by overlaying four colors (black, cyan, magenta, and yellow) on one another.

The color printer 2000 includes an optical scanning device 2010, four photosensitive drum 2030a, 2030b, 2030c, and 2030d (these four are collectively referred to as "photosensitive drums 2030"), four cleaning units 2031a, 2031b, 2031c, and 2031d (these four are collectively referred to as "cleaning units 2031"), and four electrostatic charging devices 2032a, 2032b, 2032c, and 2032d (these four are collectively referred to as "charging devices 2032"). The color printer 2000 further includes four developing rollers 2033a, 2033b, 2033c, and 2033d (these four are collectively referred to as "developing rollers 2033"), and four toner cartridges 2034a, 2034b, 2034c, and 2034d (these four are collectively referred to as "toner cartridges 2034"). The color printer 2000 further includes a transfer belt 2040, a transfer roller 2042, a fixing roller 2050, a sheet feeding roller 2054, a pair of registration rollers 2056, a sheet output roller 2058, a sheet feeding tray 2060, a sheet output tray 2070, a communication control device 2080, a density detector 2245, four home-position sensors 2246a, 2246b, 2246c, and 2246d (these four are collectively referred to as "home-position sensors 2246"), and a printer control device 2090.

The communication control device 2080 controls mutual communication with a host apparatus (e.g., a computer) over a network or the like.

The printer control device 2090 provides overall control of units included in the color printer 2000. The printer control device 2090 includes a central processing unit (CPU), a read only memory (ROM) in which a program described in codes for execution by the CPU and various types of data for use in execution of the program are stored, a random access memory (RAM) which is a working memory, and an analog-to-digital (A/D) converter circuit for converting analog data to digital data. The printer control device 2090 controls each of the units according to a request from the host apparatus and transmits image data fed from the host apparatus to the optical scanning device 2010.

The photosensitive drum 2030a, the charging device 2032a, the developing roller 2033a, the toner cartridge 2034a, and the cleaning unit 2031a are used as a set. These units make up an image forming station (hereinafter, sometimes referred to as "K station") which forms black images.

The photosensitive drum 2030b, the charging device 2032b, the developing roller 2033b, the toner cartridge 2034b, and the cleaning unit 2031b are used as a set. These units make up an image forming station (hereinafter, sometimes referred to as "C station") which forms cyan images.

The photosensitive drum 2030c, the charging device 2032c, the developing roller 2033c, the toner cartridge 2034c, and the cleaning unit 2031c are used as a set.

These units make up an image forming station (hereinafter, sometimes referred to as "M station") which forms magenta images.

The photosensitive drum 2030d, the charging device 2032d, the developing roller 2033d, the toner cartridge 2034d, and the cleaning unit 2031d are used as a set. These units make up an image forming station (hereinafter, sometimes referred to as "Y station") which forms yellow images.

Each of the photosensitive drums 2030 is an example of a latent-image carrier and has a photosensitive layer on its surface. In other words, the surface of each of the photosensitive drums 2030 functions as a surface to be scanned. The photosensitive drums 2030a, 2030b, 2030c, and 2030d are arranged with their rotating axes parallel to each other and rotate in a same direction (e.g., the direction indicated by arrowed lines in FIG. 1).

Hereinafter, it is assumed that rotating axes of the photosensitive drums 2030 are parallel to the Y-axis of an XYZ three-dimensional Cartesian coordinate system, in which the photosensitive drums 2030 are arranged in the X-axis direction.

Each of the charging devices 2032 uniformly electrostatically charges the surface of the corresponding photosensitive drum 2030. The optical scanning device 2010 emits light beams which are respectively modulated according to image data (black image data, cyan image data, magenta image data, and yellow image data) on a per-color basis onto the charged surfaces of the photosensitive drums 2030. Charges on the surface of the corresponding photosensitive drum 2030 are dissipated only at places exposed to light. As a result, a latent image representing the image data is formed on the surface of each of the photosensitive drums 2030. The thus-formed latent images move toward the developing rollers 2033 as the photosensitive drums 2030 rotate. The configuration of the optical scanning device 2010 will be described in detail later.

An area, into which image data is to be written, on each of the photosensitive drums 2030 is generally referred to as, for example, "effective scanning area", "image forming area", or "effective image area".

The toner cartridge 2034a contains black toner. The black toner is supplied to the developing roller 2033a. The toner cartridge 2034b contains cyan toner. The cyan toner is supplied to the developing roller 2033b. The toner cartridge 2034c contains magenta toner. The magenta toner is supplied to the developing roller 2033c. The toner cartridge 2034d contains yellow toner. The yellow toner is supplied to the developing roller 2033d.

A thin and uniform coating of toner supplied from the corresponding toner cartridge 2034 is applied to the surface of each of the developing rollers 2033 as the developing roller 2033 rotates. When the toner on the surface of each of the developing rollers 2033 contacts the surface of the corresponding photosensitive drum 2030, the toner transfers only to the illuminated places on the surface and sticks thereto. In short, each of the developing rollers 2033 develops the latent image formed on the corresponding photosensitive drum 2030 by causing the toner to stick to the latent image.

The transfer belt 2040, which is looped over a belt conveying mechanism, is rotated in a fixed direction. An outer surface of the transfer belt 2040 is brought into contact with the surfaces of the photosensitive drums 2030a, 2030b, 2030c, and 2030d, respectively, at locations on the side opposite from the optical scanning device 2010. The outer surface of the transfer belt 2040 is also brought into contact with the transfer roller 2042.

An image (toner image) formed with toner sticking to the surface of each of the photosensitive drums 2030 moves toward the transfer belt 2040 as the photosensitive drum 2030 rotates. The yellow, magenta, cyan, and black toner images are sequentially transferred onto the transfer belt 2040 at respective predetermined timing, and overlaid on one another to form a full-color image. The full-color image formed on the transfer belt 2040 moves toward the transfer roller 2042 as the transfer belt 2040 rotates.

Sheets of recording paper are stored in the sheet feeding tray 2060. The sheet feeding roller 2054 is arranged near the sheet feeding tray 2060. The sheet feeding roller 2054 picks up the recording sheets one sheet by one sheet from the sheet feeding tray 2060 and conveys the recording sheet to the pair of registration rollers 2056.

The pair of registration rollers 2056 delivers the recording sheet toward a nip between the transfer belt 2040 and the transfer roller 2042 at predetermined timing. Hence, the full-color image on the transfer belt 2040 is transferred onto the recording sheet. The recording sheet, onto which the full-color image is transferred, is delivered to the fixing roller 2050.

The fixing roller 2050 applies heat and pressure onto the recording sheet. The fixing roller 2050 thereby fixes the toner onto the recording sheet. Recording sheets, to each of which toner is fixed, are delivered one sheet by one sheet to the sheet output tray 2070 via the sheet output roller 2058 to be stacked on the sheet output tray 2070.

Each of the cleaning units 2031 removes toner (residual toner) remaining on the surface of the corresponding photosensitive drum 2030. The surface of the photosensitive drum 2030, from which the residual toner is removed, returns to a position where the surface faces the corresponding charging device 2032.

Figure 2:
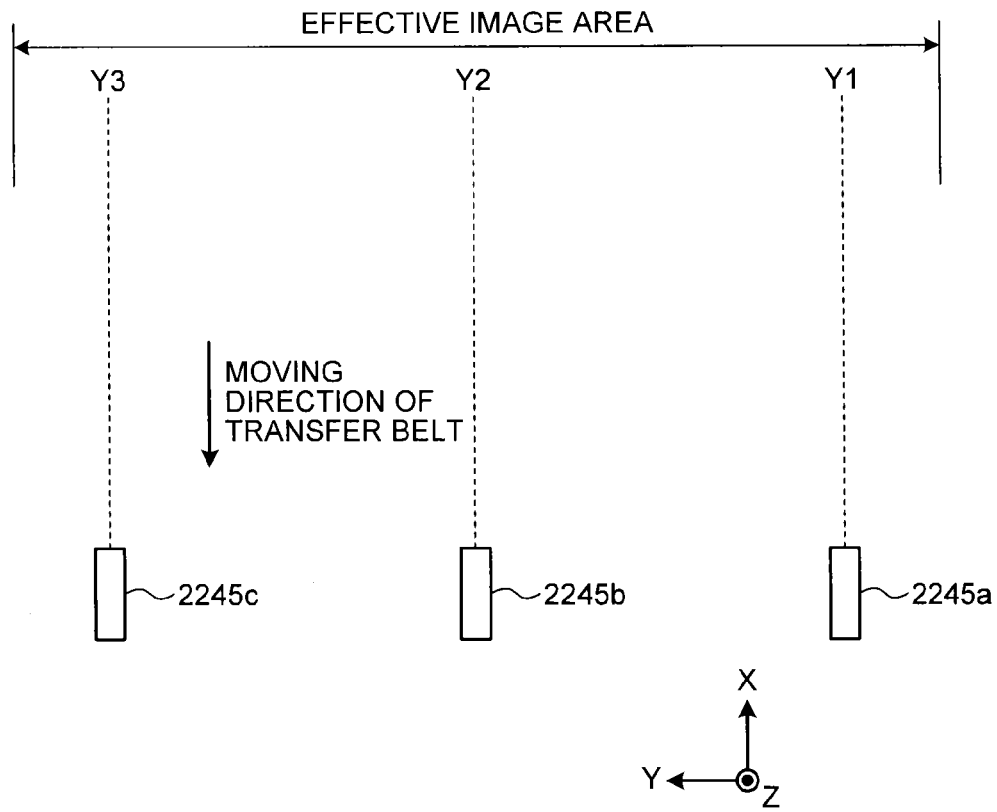
FIG. 2 is a diagram of an example arrangement of optical sensors.

The density detector 2245 is arranged on the negative side of the X-axis (hereinafter, "−X side") (the side upstream from the fixing roller 2050 in a moving direction of the transfer belt 2040 and downstream of the four photosensitive drums 2030) with respect to the transfer belt 2040. The density detector 2245 may include, for example, three optical sensors 2245a, 2245b, and 2245c as illustrated in FIG. 2.

The optical sensor 2245a is arranged at a position at which the optical sensor 2245a faces a portion (which is at one end in the width direction of the transfer belt 2040) near an end on the −Y side of the effective image area on the transfer belt 2040. The optical sensor 2245c is arranged at a position at which the optical sensor 2245c faces a portion (which is at the other end in the width direction of the transfer belt 2040) near an end on the +Y side of the effective image area on the transfer belt 2040. The optical sensor 2245b is arranged at about a midpoint position (which is at a width center of the transfer belt 2040) in the main-scanning direction between the optical sensor 2245a and the optical sensor 2245c. Hereinafter, the center of the optical sensor 2245a in the main-scanning direction (i.e., the Y-axis direction) is referred to as "Y1"; the center of the optical sensor 2245b is referred to as "Y2"; the center of the optical sensor 2245c is referred to as "Y3".

Figure 3:
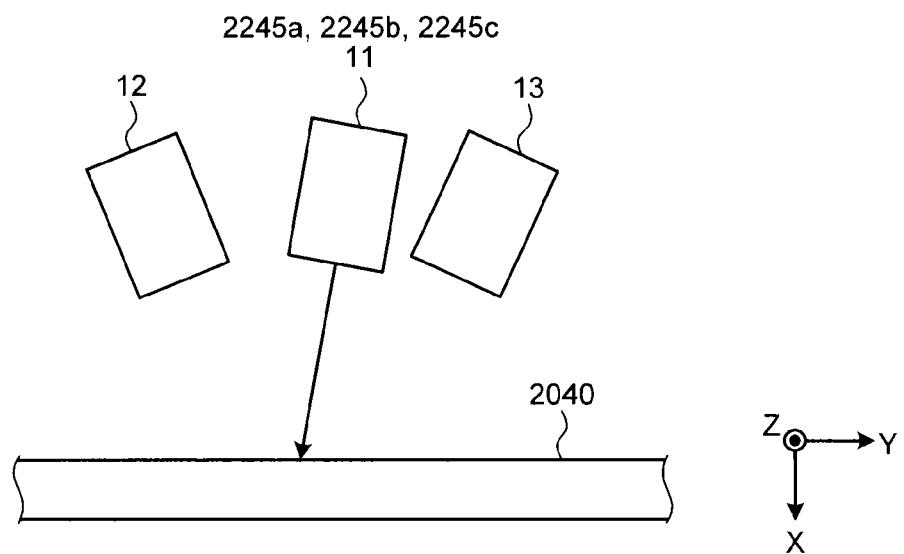
FIG. 3 is a diagram of a configuration of the optical sensors.

Each of the optical sensors 2245a, 2245b, and 2245c includes, for example, a light-emitting diode (LED) 11 for emitting light (hereinafter, "detection light") toward the transfer belt 2040, a specularly-reflected-light photo-detector 12 for receiving light emitted from the LED 11 and then specularly reflected from the transfer belt 2040 or a toner pad on the transfer belt 2040, and a diffusely-reflected-light photo-detector 13 for receiving light emitted from the LED 11 and then diffusely reflected from the transfer belt 2040 or the toner pad on the transfer belt 2040 as illustrated in FIG. 3. Each of the photo-detectors 12 and 13 outputs a signal (photoelectric conversion signal) responsive to the intensity of the received light.

The home-position sensor 2246a detects a rotational home position of the photosensitive drum 2030a. The home-position sensor 2246b detects a rotational home position of the photosensitive drum 2030b. The home-position sensor 2246c detects a rotational home position of the photosensitive drum 2030c. The home-position sensor 2246d detects a rotational home position of the photosensitive drum 2030d.

Figure 4:
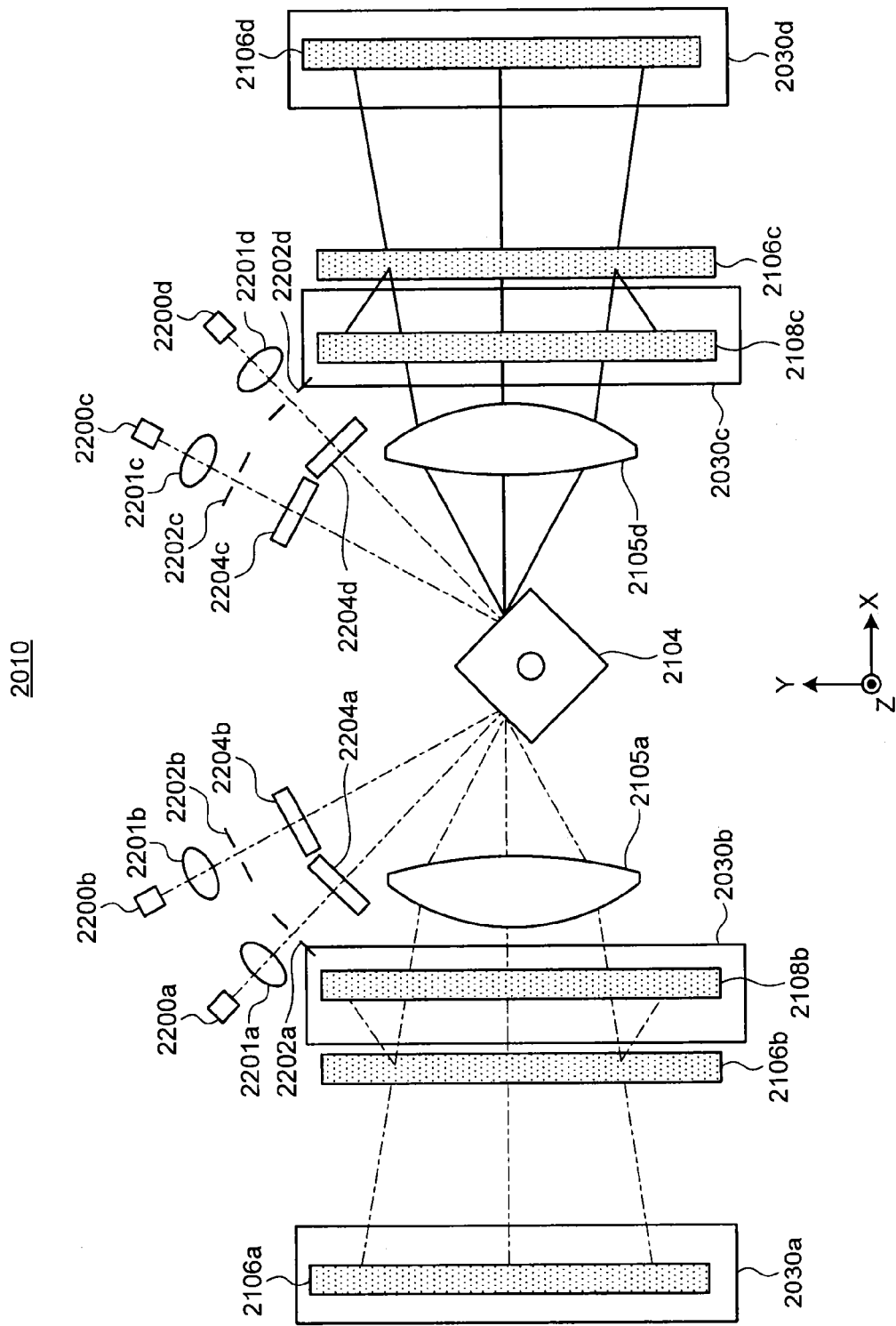
FIG. 4 is a diagram of a configuration of an optical system of an optical scanning device.
Figure 5:
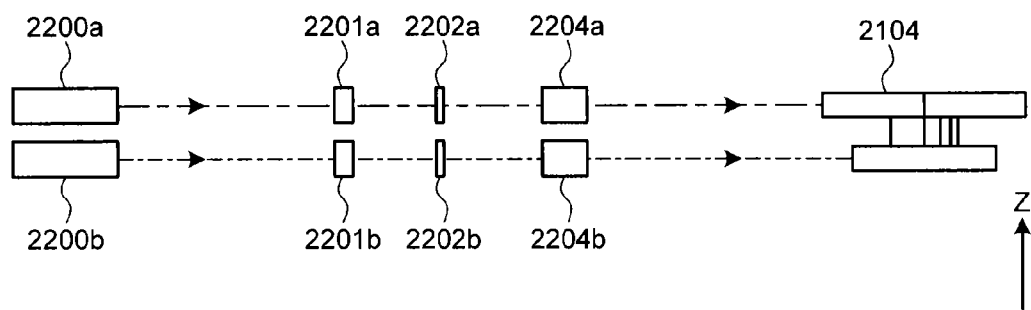
FIG. 5 is a diagram of an example of an optical path from a light source to a polygon mirror and an optical path from a light source to the polygon mirror.
Figure 6:
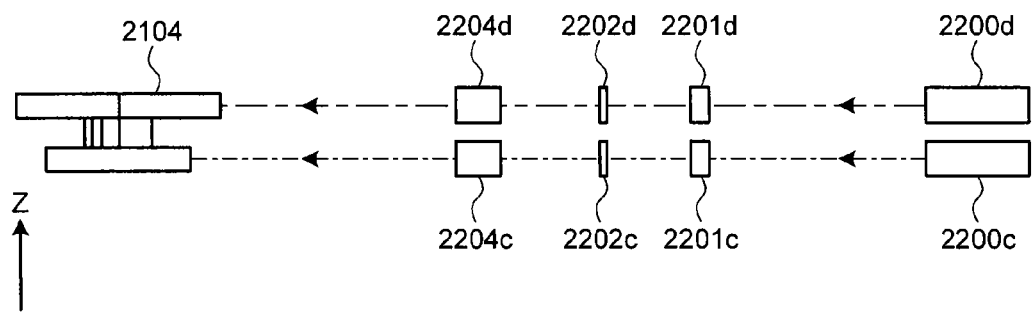
FIG. 6 is a diagram of an example of an optical path from a light source to the polygon mirror and an optical path from a light source to the polygon mirror.
Figure 7:
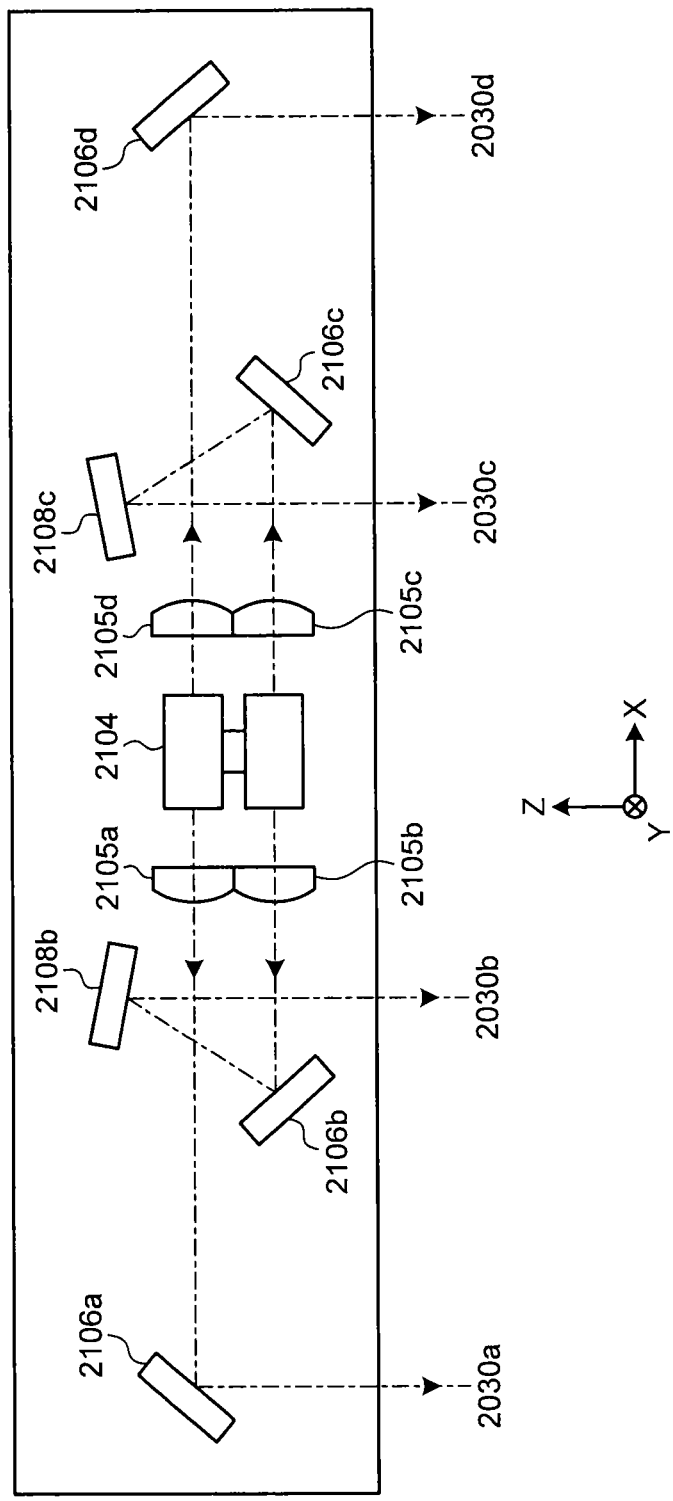
FIG. 7 is a diagram of an example of optical paths from the polygon mirror to each of photosensitive drums.

FIG. 4 is a diagram of a configuration of an optical system of the optical scanning device 2010. FIG. 5 is a diagram of an example of an optical path from a light source 2200a to a polygon mirror 2104 and an optical path from a light source 2200b to the polygon mirror 2104. FIG. 6 is a diagram of an example of an optical path from a light source 2200c to the polygon mirror 2104 and an optical path from a light source 2200d to the polygon mirror 2104. FIG. 7 is a diagram of an example of optical paths from the polygon mirror 2104 to each of the photosensitive drums 2030.

The configuration of the optical system of the optical scanning device 2010 is described below. The optical scanning device 2010 includes, as the optical system, the four light sources 2200a, 2200b, 2200c, and 2200d, four coupling lenses 2201a, 2201b, 2201c, and 2201d, four aperture plates 2202a, 2202b, 2202c, and 2202d, and four cylindrical lenses 2204a, 2204b, 2204c, and 2204d. The optical scanning device 2010 further includes, as the optical system, the polygon mirror 2104, four scanning lenses 2105a, 2105b, 2105c, and 2105d, and six folding mirrors 2106a, 2106b, 2106c, 2106d, 2108b, and 2108c. These elements are assembled to predetermined positions in an optical housing.

The optical scanning device 2010 further includes an electrical system circuit, which will be described later with reference to FIG. 8 and other following figures.

Each of the light sources 2200a, 2200b, 2200c, and 2200d includes a surface-emitting laser array, in which a plurality of light emitters is arranged in a two-dimensional array. The plurality of light emitters of the surface-emitting laser array is arranged in such a manner that when all the light emitters are orthogonally projected onto a virtual line extending in the sub-scanning direction, the light emitters are equidistant from each other. Each of the light sources 2200a, 2200b, 2200c, and 2200d may be a vertical-cavity surface-emitting laser (VCSEL), for example.

The coupling lens 2201a, which is arranged on the optical path of light emitted from the light source 2200a, shapes a light beam passing therethrough into a substantially parallel light beam. The coupling lens 2201b, which is arranged on the optical path of light emitted from the light source 2200b, shapes a light beam passing therethrough into a substantially parallel light beam. The coupling lens 2201c, which is arranged on the optical path of light emitted from the light source 2200c, shapes a light beam passing therethrough into a substantially parallel light beam. The coupling lens 2201d, which is arranged on the optical path of light emitted from the light source 2200d, shapes a light beam passing therethrough into a substantially parallel light beam.

The aperture plate 2202a has an opening which limits the size of the light beam passing therethrough after exiting from the coupling lens 2201a. The aperture plate 2202b has an opening which limits the size of the light beam passing therethrough after exiting from the coupling lens 2201b. The aperture plate 2202c has an opening which limits the size of the light beam passing therethrough after exiting from the coupling lens 2201c. The aperture plate 2202d has an opening which limits the size of the light beam passing therethrough after exiting from the coupling lens 2201d.

The cylindrical lens 2204a focuses the light beam exiting from the opening of the aperture plate 2202a with respect to the Z-axis direction to form an image at a position near a deflection reflection surface of the polygon mirror 2104. The cylindrical lens 2204b focuses the light beam exiting from the opening of the aperture plate 2202b with respect to the Z-axis direction to form an image at a position near a deflection reflection surface of the polygon mirror 2104. The cylindrical lens 2204c focuses the light beam exiting from the opening of the aperture plate 2202c with respect to the Z-axis direction to form an image at a position near a deflection reflection surface of the polygon mirror 2104. The cylindrical lens 2204d focuses the light beam exiting from the opening of the aperture plate 2202d with respect to the Z-axis direction to form an image at a position near a deflection reflection surface of the polygon mirror 2104.

The optical system made up of the coupling lens 2201a, the aperture plate 2202a, and the cylindrical lens 2204a is a pre-deflector optical system of the K station. The optical system made up of the coupling lens 2201b, the aperture plate 2202b, and the cylindrical lens 2204b is a pre-deflector optical system of the C station. The optical system made up of the coupling lens 2201c, the aperture plate 2202c, and the cylindrical lens 2204c is a pre-deflector optical system of the M station. The optical system made up of the coupling lens 2201d, the aperture plate 2202d, and the cylindrical lens 2204d is a pre-deflector optical system of the Y station.

The polygon mirror 2104 includes four-facet polygon mirrors, which rotate about an axis parallel to the Z-axis, stacked in two layers. Each of the mirror facets is the deflection reflection surface. The four-facet polygon mirror on the first layer (lower layer) is arranged so as to deflect the light beam from the cylindrical lens 2204b and the light beam from the cylindrical lens 2204c. The four-facet polygon mirror on the second layer (upper layer) is arranged so as to deflect the light beam from the cylindrical lens 2204a and the light beam from the cylindrical lens 2204d.

Each of the light beam exiting from the cylindrical lens 2204a and the light beam exiting from the cylindrical lens 2204b is deflected toward the −X side with respect to the polygon mirror 2104. Each of the light beam exiting from the cylindrical lens 2204c and the light beam exiting from the cylindrical lens 2204d is deflected toward the +X side with respect to the polygon mirror 2104.

Each of the scanning lenses 2105a, 2105b, 2105c, and 2105d has optical power which causes a light beam to be focused on vicinity of the corresponding photosensitive drum 2030 and which causes a light spot on the surface of the photosensitive drum 2030 to move in the main-scanning direction with a constant velocity as the polygon mirror 2104 rotates.

The scanning lens 2105a and the scanning lens 2105b are arranged on the −X side with respect to the polygon mirror 2104. The scanning lens 2105c and the scanning lens 2105d are arranged on the +X side with respect to the polygon mirror 2104.

The scanning lens 2105a and the scanning lens 2105b are stacked in the Z-axis direction. The scanning lens 2105b is facing the four-facet polygon mirror on the first layer. The scanning lens 2105a is facing the four-facet polygon mirror on the second layer.

The scanning lens 2105c and the scanning lens 2105d are stacked in the Z-axis direction. The scanning lens 2105c is facing the four-facet polygon mirror on the first layer. The scanning lens 2105d is facing the four-facet polygon mirror on the second layer.

The light beam exiting from the cylindrical lens 2204a and deflected by the polygon mirror 2104 impinges, via the scanning lens 2105a and the folding mirror 2106a, on the photosensitive drum 2030a to form a light spot thereon. The light spot moves in the longitudinal direction of the photosensitive drum 2030a as the polygon mirror 2104 rotates. In other words, the light spot scans over the photosensitive drum 2030a. The direction in which the scanning light spot moves is the "main-scanning direction" of the photosensitive drum 2030a. The direction in which the photosensitive drum 2030a rotates is the "sub-scanning direction" of the photosensitive drum 2030a.

The light beam exiting from the cylindrical lens 2204b and deflected by the polygon mirror 2104 impinges, via the scanning lens 2105b, the folding mirror 2106b, and the folding mirror 2108b, on the photosensitive drum 2030b to form a light spot thereon. The light spot moves in the longitudinal direction of the photosensitive drum 2030b as the polygon mirror 2104 rotates. In other words, the light spot scans over the photosensitive drum 2030b. The direction in which the scanning light spot moves is the "main-scanning direction" of the photosensitive drum 2030b. The direction in which the photosensitive drum 2030b rotates is the "sub-scanning direction" of the photosensitive drum 2030b.

The light beam exiting from the cylindrical lens 2204c and deflected by the polygon mirror 2104 impinges, via the scanning lens 2105c, the folding mirror 2106c, and the folding mirror 2108c, on the photosensitive drum 2030c to form a light spot thereon. The light spot moves in the longitudinal direction of the photosensitive drum 2030c as the polygon mirror 2104 rotates. In other words, the light spot scans over the photosensitive drum 2030c. The direction in which the scanning light spot moves is the "main-scanning direction" of the photosensitive drum 2030c. The direction in which the photosensitive drum 2030c rotates is the "sub-scanning direction" of the photosensitive drum 2030c.

The light beam exiting from the cylindrical lens 2204d and deflected by the polygon mirror 2104 impinges, via the scanning lens 2105d and the folding mirror 2106d, on the photosensitive drum 2030d to form a light spot thereon. The light spot moves in the longitudinal direction of the photosensitive drum 2030d as the polygon mirror 2104 rotates. In other words, the light spot scans over the photosensitive drum 2030d. The direction in which the scanning light spot moves is the "main-scanning direction" of the photosensitive drum 2030d. The direction in which the photosensitive drum 2030d rotates is the "sub-scanning direction" of the photosensitive drum 2030d.

The folding mirrors 2106a, 2106b, 2106c, 2106d, 2108b, and 2108c are arranged so that optical paths from the polygon mirror 2104 to the photosensitive drums 2030 are equal to each other in length and that light beams impinge at a same incident angle on equivalent incident positions on the photosensitive drums 2030.

Each of the optical systems arranged on the optical paths between the polygon mirror 2104 and the photosensitive drums 2030 is often referred to as a scanning optical system. In this example, the scanning lens 2105a and the folding mirror 2106a make up a scanning optical system of the K station. The scanning lens 2105b and the two folding mirrors 2106b and 2108b make up a scanning optical system of the C station. The scanning lens 2105c and the two folding mirrors 2106c and 2108c make up a scanning optical system of the M station. The scanning lens 2105d and the folding mirror 2106d make up a scanning optical system of the Y station. The scanning lens 2105 of each of the scanning optical systems may include a plurality of lenses.

Figure 8:
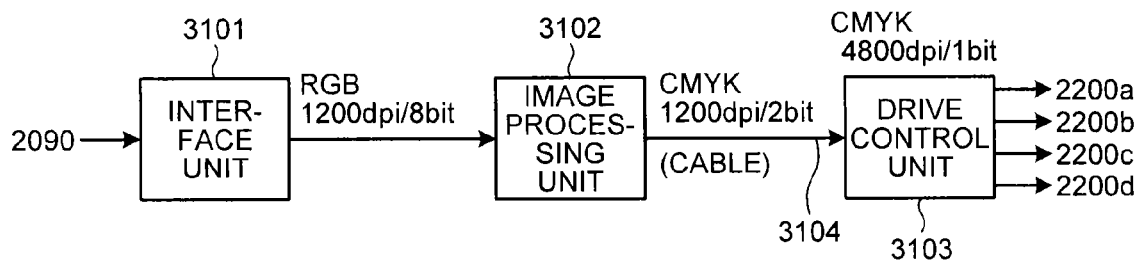
FIG. 8 is a diagram of a configuration of an electrical system of the optical scanning device.

FIG. 8 is a diagram of a configuration of the electrical system of the optical scanning device 2010. The optical scanning device 2010 includes, as elements of the electrical system, an interface unit 3101, an image processing unit 3102, and a drive control unit 3103.

The interface unit 3101 receives, from the printer control device 2090, image data transferred to the printer control device 2090 from a host apparatus (e.g., a computer). The interface unit 3101 passes the received image data to the image processing unit 3102 in the subsequent stage.

In this example, the interface unit 3101 receives RGB 8-bit image data of a resolution of 1,200-dpi and passes the image data to the image processing unit 3102.

The image processing unit 3102 receives the image data from the interface unit 3101 and converts it into color image data of a format suited for an employed printing method. For example, the image processing unit 3102 may convert image data of the RGB system into image data for tandem printing (of the CMYK system). The image processing unit 3102 performs not only the data format conversion but also various types of image processing.

In this example, the image processing unit 3102 outputs CMYK 2-bit image data of a resolution of 1,200-dpi. The resolution of image data to be output from the image processing unit 3102 is not limited to 1,200 dpi, and can be any resolution. The resolution of image data to be output from the image processing unit 3102 is referred to as a first resolution hereinafter.

The drive control unit 3103 receives the image data of the first resolution from the image processing unit 3102 and converts it into color image data of a second resolution suited to driving the light sources. Note that the second resolution is higher than the first resolution. In this example, the drive control unit 3103 converts image data into CMYK 1-bit image data of a resolution of 4,800-dpi.

The drive control unit 3103 generates a modulated signal for each of the colors by modulating the image data with clock signal which defines light emission timing of the light source 2200. The drive control unit 3103 drives each of the light sources 2200a, 2200b, 2200c, and 2200d according to the modulated signal of the corresponding color, thereby causing the light source 2200 to emit light.

The drive control unit 3103 may be, for example, a one-chip integrated circuit (IC) arranged near the light sources 2200a, 2200b, 2200c, and 2200d. The image processing unit 3102 and the interface unit 3101 are arranged away from the light sources 2200a, 2200b, 2200c, and 2200d than the drive control unit 3103. A cable 3104 connects between the image processing unit 3102 and the drive control unit 3103.

The optical scanning device 2010 configured as described above is capable of forming latent images by causing the light sources 2200a, 2200b, 2200c, and 2200d to emit light in accordance with image data.

Figure 9:
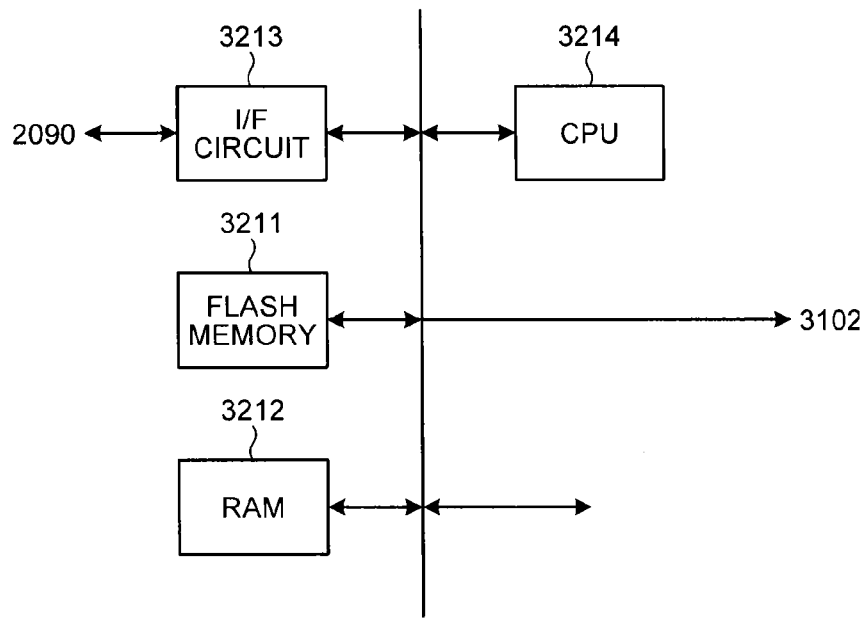
FIG. 9 is a diagram of a configuration of an interface unit.

FIG. 9 is a diagram of a configuration of the interface unit 3101. The interface unit 3101 may include, for example, a flash memory 3211, a RAM 3212, an I/F circuit 3213, and a CPU 3214. The flash memory 3211, the RAM 3212, the I/F circuit 3213, and the CPU 3214 are connected to each other via a bus.

The flash memory 3211 stores a program to be executed by the CPU 3214 and various types of data necessary for the CPU 3214 to execute the program. The RAM 3212 is a working memory for use by the CPU 3214 in execution of the program. The I/F circuit 3213 carries out mutual communication with the printer control device 2090.

The CPU 3214 provides overall control of the optical scanning device 2010 by operating according to the program stored in the flash memory 3211. The interface unit 3101 configured as described above receives image data (in this example, RGB, 8-bit, 1,200-dpi image data) from the printer control device 2090 and passes the image data to the image processing unit 3102.

Figure 10:
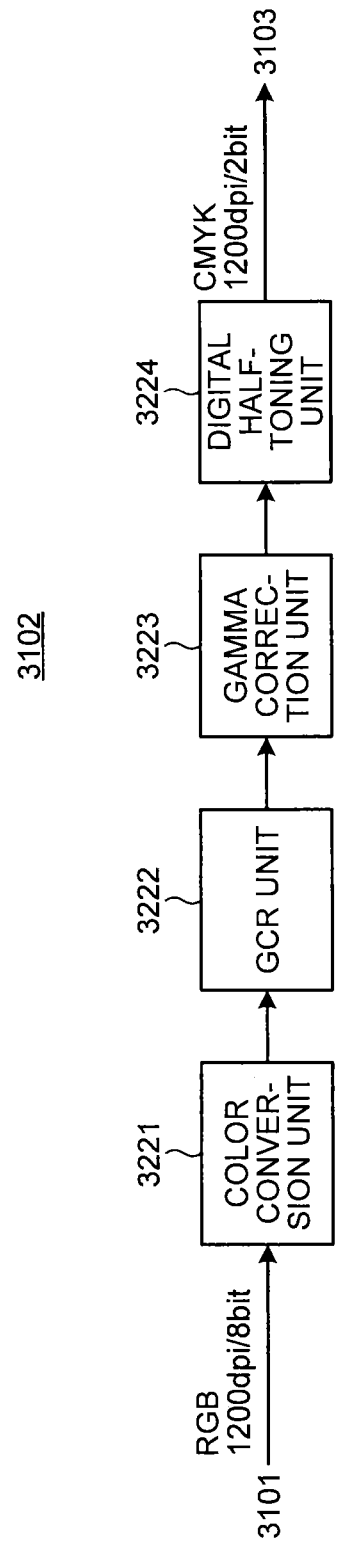
FIG. 10 is a diagram of a configuration of an image processing unit.

FIG. 10 is a diagram of a configuration of the image processing unit 3102. The image processing unit 3102 includes a color conversion unit 3221, a gray component replacement unit (hereinafter, "GCR unit") 3222, a gamma correction unit 3223, and a digital half-toning unit 3224.

The color conversion unit 3221 converts 8-bit RGB image data into 8-bit CMY image data. The GCR unit 3222 generates a gray (black) component based on the CMY image data, which is generated by the color conversion unit 3221, to thereby generate CMYK image data. The gamma correction unit 3223 linearly changes levels of the respective colors using a table or the like.

The digital half-toning unit 3224 receives 8-bit image data (input image data) from the gamma correction unit 3223. The digital half-toning unit 3224 reduces the number of gray levels of the received (input) 8-bit image data and outputs 2-bit image data. The digital half-toning unit 3224 may reduce the number of gray levels of the input 8-bit image data by, for example, digital half-toning using a dithering technique or an error diffusion technique.

The image processing unit 3102 configured as described above outputs CMYK 2-bit image data of the first resolution (e.g., 1,200 dpi) to the drive control unit 3103. A part of or the entire image processing unit 3102 may be implemented in hardware or in a software program executed by a CPU.

Figure 11:
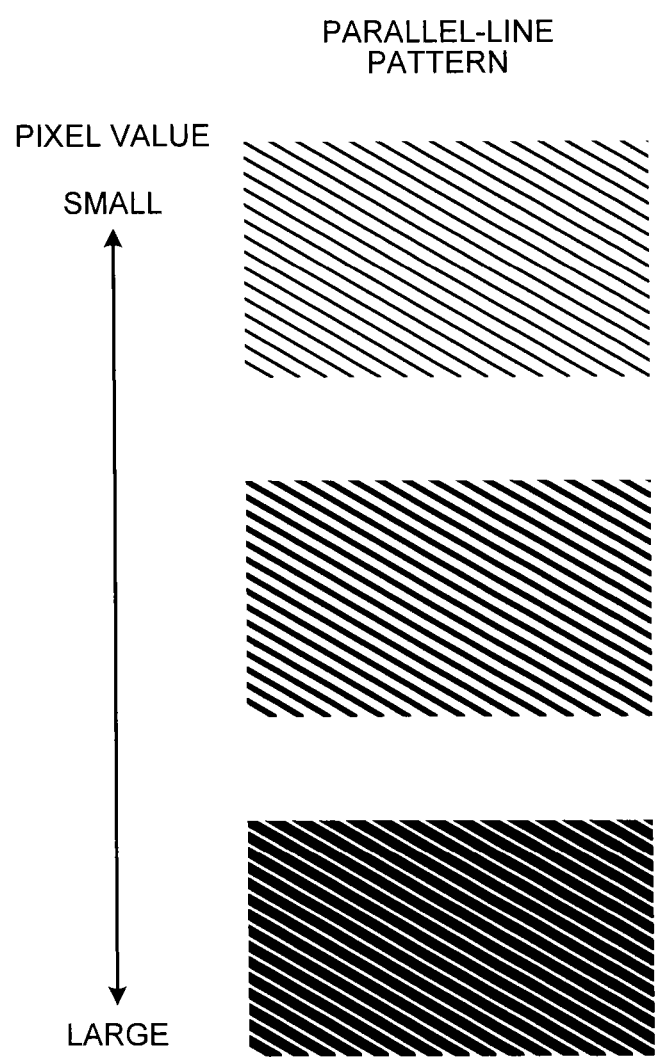
FIG. 11 is a diagram of an example of a parallel-line pattern generated by a digital half-toning unit.

FIG. 11 is a diagram of an example of a parallel-line pattern generated by the digital half-toning unit 3224. The digital half-toning unit 3224 performs parallel-line dithering as one of half-toning schemes for reducing the number of gray levels. More specifically, the digital half-toning unit 3224 converts each uniform-pixel-value region in the input 8-bit image data to a parallel-line pattern formed with a plurality of parallel lines extending obliquely with respect to the direction in which pixels are arrayed, thereby expressing each gray level as an area percentage.

In this example, the digital half-toning unit 3224 converts each uniform-pixel-value region, which is a region of pixels having a same pixel value, to a parallel-line pattern formed with a plurality of lines of which area percentage depends on the pixel value. By performing conversion in this manner, the digital half-toning unit 3224 can generate image data, in which each gray level of original (input) image regions is expressed as an area percentage.

For example, the digital half-toning unit 3224 may generate a parallel-line pattern formed with a predetermined number of lines (screen ruling) per unit length. In this case, the digital half-toning unit 3224 varies the line width of each of the parallel-line pattern according to a pixel value of the original image data. More specifically, the digital half-toning unit 3224 sets the line widths so that the smaller the pixel value, the narrower the line width, and vice versa. By setting the line widths in this manner, the digital half-toning unit 3224 can generate the plurality of lines of which area percentage depends on the corresponding pixel value.

Alternatively, the digital half-toning unit 3224 may change the screen ruling according to a set value. The digital half-toning unit 3224 sets an angle (screen angle) relative to the direction, in which pixels are arrayed, of the plurality of lines constituting the parallel-line pattern according to the set value.

The digital half-toning unit 3224 may form a parallel-line pattern by rendering a plurality of lines with two gray levels, for example. In this case, the digital half-toning unit 3224 may assign a black value (i.e., a value which sets the intensity of light to be emitted from the light source 2200 to 100%) to pixels belonging to any line and a white value (i.e., a value which sets the intensity of light to be emitted from the light source 2200 to 0%) to pixels not belonging to any line, for example.

Alternatively, the digital half-toning unit 3224 may form a parallel-line pattern by rendering a plurality of lines with three or more gray levels, for example. In this case, the digital half-toning unit 3224 may assign the black value (i.e., the value which sets the intensity of light to be emitted from the light source 2200 to 100%) to pixels belonging to a center portion of any line, a midtone value (i.e., a value which sets the intensity of light to be emitted from the light source 2200 to 50%, for example) to pixels belonging to an edge portion of any line, and the white value (i.e., the value which sets the intensity of light to be emitted from the light source 2200 to 0%) to pixels not belonging to any line, for example.

Figure 12:
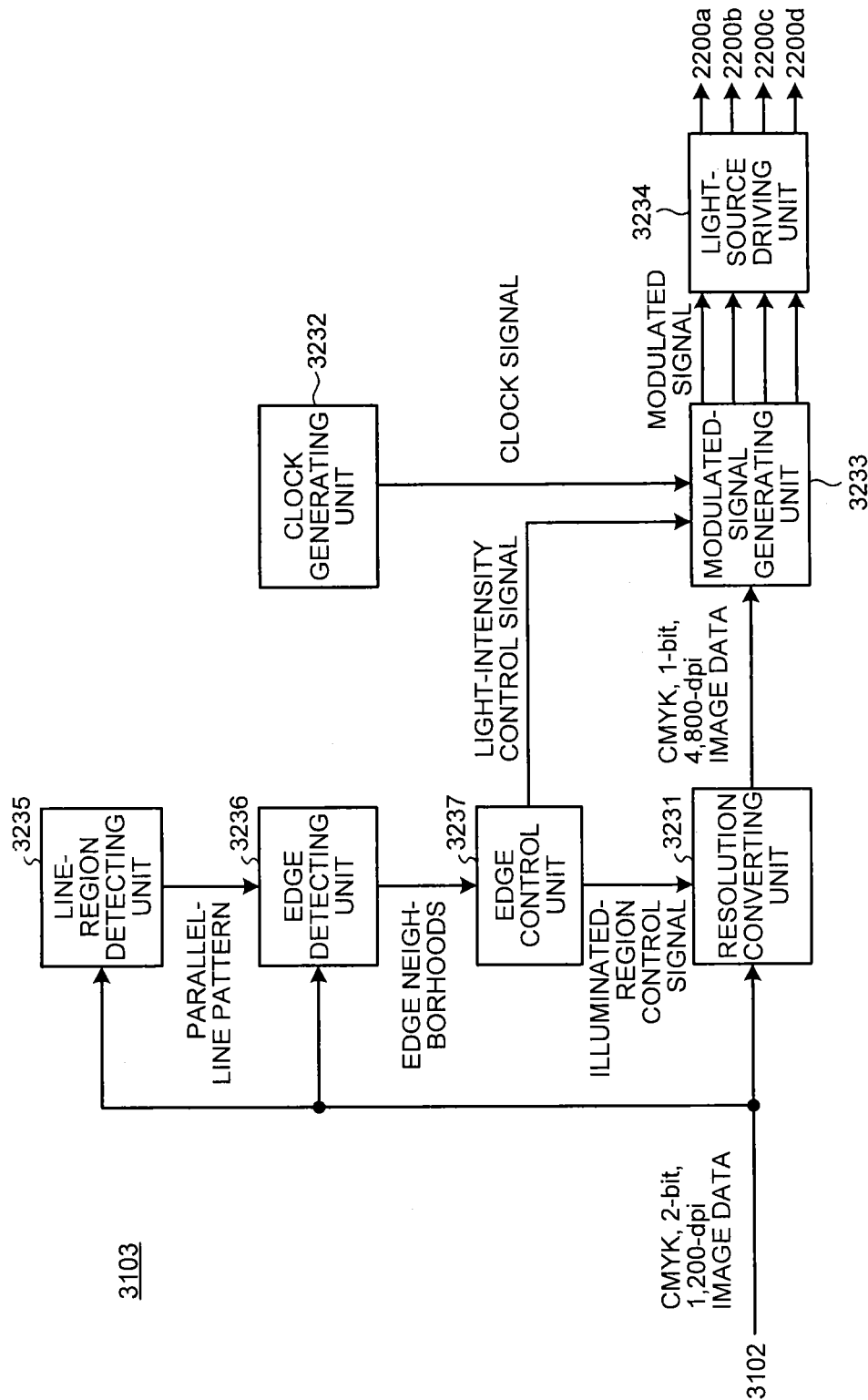
FIG. 12 is a diagram of a configuration of a drive control unit.

FIG. 12 is a diagram of a configuration of the drive control unit 3103. The drive control unit 3103 includes a resolution converting unit 3231, a clock generating unit 3232, a modulated-signal generating unit 3233, a light-source driving unit 3234, a line-region detecting unit 3235, an edge detecting unit 3236, and an edge control unit 3237.

The resolution converting unit 3231 receives image data of the first resolution from the image processing unit 3102 and converts it into color image data of the second resolution, which is higher than the first resolution. In this example, the resolution converting unit 3231 converts CMYK, 2-bit, 1,200-dpi image data into CMYK, 1-bit, 4,800-dpi image data. More specifically, for example, the resolution converting unit 3231 performs resolution conversion by converting each horizontal dot (in the main-scanning direction) in the 1,200-dpi image data represented in 2-bit gray scale into horizontal 4 dots in 4,800-dpi image data represented in 1-bit gray scale.

Meanwhile, no specific limitation is imposed on the gray scale of image data obtained by the resolution conversion so long as the resolution converting unit 3231 converts image data of a resolution N (N is a natural number) into image data of a resolution of m×N (m is a natural number greater than one).

The clock generating unit 3232 generates the clock signal which defines light emission timing of the light source 2200. The clock signal allows phase modulation at a resolution of, for example, a ⅛ clock period.

The modulated-signal generating unit 3233 generates a modulated signal for each of the colors by modulating image data of each color with the clock signal. In this example, the modulated-signal generating unit 3233 generates a modulated signal for each of cyan (C), magenta (M), yellow (Y), and black (K). The modulated-signal generating unit 3233 modulates, on the per-color basis, the image data with the clock signal in a manner of synchronizing the image data with write-start timing which depends on the rotational position of the photosensitive drum 2030. The modulated-signal generating unit 3233 supplies the modulated signals of the respective colors to the light-source driving unit 3234.

The light-source driving unit 3234 drives each of the light sources 2200*a*, 2200*b*, 2200*c*, and 2200*d* in accordance with corresponding one of the modulated signals of the respective colors fed from the modulated-signal generating unit 3233. Thus, the light-source driving unit 3234 can cause each of the light sources 2200*a*, 2200*b*, 2200*c*, and 2200*d* to emit light with light intensity according to the modulated signal.

The line-region detecting unit 3235 receives the image data of the first resolution from the image processing unit 3102 and detects parallel-line patterns from the image data of the first resolution. The line-region detecting unit 3235 outputs signals indicating the parallel-line patterns of the image data of the first resolution and detection positions where the patterns are detected.

For example, the line-region detecting unit 3235 may detect the parallel-line patterns by performing image pattern analysis. Alternatively, the line-region detecting unit 3235 may detect the parallel-line patterns by receiving information indicating regions to which the parallel-line dithering is applied from the image processing unit 3102, for example.

The edge detecting unit 3236 receives the image data of the first resolution from the image processing unit 3102, and the signals indicating the parallel-line patterns and the detection positions from the line-region detecting unit 3235. The edge detecting unit 3236 detects pixels (line neighborhoods), each of which is near an edge of any one of the plurality of lines, from the parallel-line patterns of the image data of the first resolution. The edge detecting unit 3236 then outputs signals indicating locations of the edge neighborhoods.

The edge of a line denoted above is a longitudinal side of the line. A line neighborhood denotes a portion formed with pixels on a longitudinal side of a line and pixels within a predetermined range from the longitudinal side.

The edge detecting unit 3236 may detect the edge neighborhoods from the parallel-line patterns of the image data of the first resolution detected by the line-region detecting unit 3235 by pattern matching, for example. Alternatively, the edge detecting unit 3236 may detect the edge neighborhoods by performing image analysis of the regions, which are detected as the parallel-line patterns by the line-region detecting unit 3235.

The edge control unit 3237 receives the signals indicating the locations of the edge neighborhoods from the edge detecting unit 3236. The edge control unit 3237 narrows a region, which is to be illuminated by the light emitted from the light source 2200, in each of the edge neighborhoods of the plurality of lines constituting the parallel-line patterns, while increasing the intensity of the light to be emitted from the light source 2200.

More specifically, the edge control unit 3237 controls the resolution conversion performed on the edge neighborhood by supplying an illuminated-region control signal to the resolution converting unit 3231, thereby causing the to-be-illuminated region to be illuminated by the light emitted from the light source 2200 of the edge neighborhood to be narrowed. To be more specific, the edge control unit 3237 causes the to-be-illuminated region of the edge neighborhood to be narrowed when the resolution conversion of increasing the resolution of the edge neighborhood from the first resolution (1,200 dpi) to the second resolution (4,800 dpi) is performed.

Meanwhile, the edge control unit 3237 narrows the to-be-illuminated region of the edge neighborhood from an outer side toward a center of the line. In other words, the edge control unit 3237 narrows the to-be-illuminated region by trimming away an outer-edge portion of the line.

Furthermore, the edge control unit 3237 controls modulation processing performed on the edge neighborhood by supplying a light-intensity control signal to the modulated-signal generating unit 3233, thereby causing the intensity of the light to be emitted to the edge neighborhood from the light source 2200 to increase. In other words, the edge control unit 3237 controls modulation so that the intensity of light incident on the edge neighborhood becomes higher than the intensity of light incident on the other portion.

Furthermore, the edge control unit 3237 narrows the to-be-illuminated region and increases the light intensity in a manner of causing the light source 2200 to emit the same luminous energy as luminous energy to be emitted when the edge control unit 3237 controls none of the to-be-illuminated region and the light intensity. More specifically, for example, when halving the to-be-illuminated region, the edge control unit 3237 doubles the light intensity. That is, the edge control unit 3237 narrows the to-be-illuminated region and increases the light intensity so that a product of a ratio of the to-be-illuminated region decrease and a ratio of the light intensity increase is constantly one.

Figure 13:
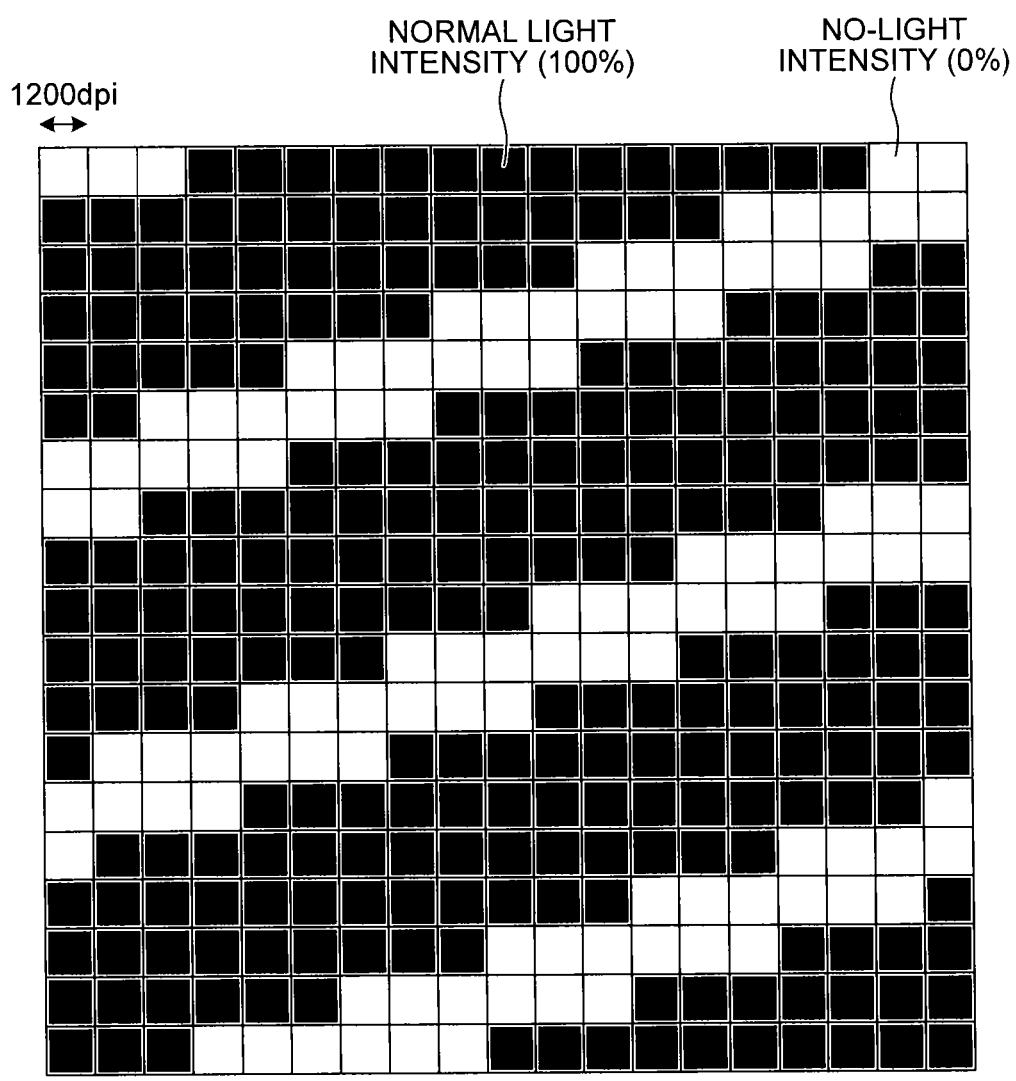
FIG. 13 is a diagram of a portion of a parallel-line pattern of 1,200-dpi image data.

FIG. 13 is a diagram of a portion of a parallel-line pattern of 1,200-dpi image data. Note that positions of cells in FIGS. 13 to 20, 22, and 24, each illustrating image data, correspond to positions of pixels at the resolution specified in each drawing.

A plurality of lines constituting a parallel-line pattern extends obliquely with respect to the direction in which pixels are arrayed. Accordingly, as shown in FIG. 13, each of edges of the lines has a step-like shape of which step height is equal to or larger than one pixel of the first resolution (1,200 dpi).

A pixel value which causes the light source 2200 to emit light at normal light intensity (100%) is assigned to (black) pixels constituting the lines. A pixel value which sets the light source 2200 to no-light intensity (0%) is assigned to (white) pixels not constituting any line.

Figure 14:
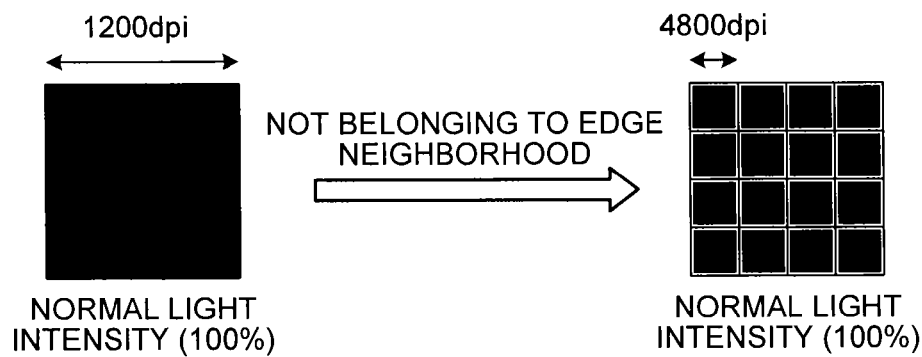
FIG. 14 is a diagram illustrating resolution conversion performed on a pixel not belonging to any edge neighborhood.

FIG. 14 is a diagram illustrating resolution conversion performed on a pixel not belonging to any edge neighborhood. To perform conversion from 1,200-dpi image data into 4,800-dpi image data, the resolution converting unit 3231 converts each pixel of the 1,200-dpi image data to 16 pixels (4 horizontal pixels by 4 vertical pixels) of the 4,800-dpi image data.

When a pixel not belonging to any edge neighborhood in the 1,200-dpi image data represents the normal light intensity (100%), the resolution converting unit 3231 assigns a value representing the normal light intensity (100%) to corresponding 16 pixels of the 4,800-dpi image data. By performing conversion in this manner, the resolution converting unit 3231 can keep the light intensity invariant before and after the resolution conversion.

Figure 15:
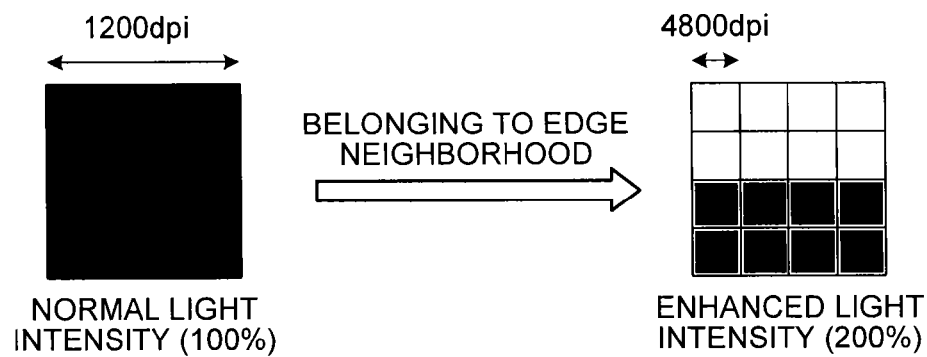
FIG. 15 is a diagram illustrating resolution conversion performed on a pixel in an edge neighborhood.

FIG. 15 is a diagram illustrating resolution conversion performed on a pixel in an edge neighborhood. In a case where a pixel in an edge neighborhood in 1,200-dpi image data represents the normal light intensity (100%), the edge control unit 3237 causes some of the corresponding 16 pixels of 4,800-dpi image data to emit light at enhanced light intensity (200%), which is higher than the normal light intensity, and lights off the remainder of the 16 pixels. By performing control in this manner, the edge control unit 3237 can narrow the to-be-illuminated region in the edge neighborhood of each of the lines constituting the parallel-line pattern while increasing the light intensity.

For example, as illustrated in FIG. 15, the edge control unit 3237 may cause 8 pixels of 16 pixels of 4,800-dpi image data to emit light at the enhanced light intensity, and light off the other 8 pixels. By performing control in this manner, the edge control unit 3237 can halve the to-be-illuminated region of the edge neighborhood while doubling the light intensity. Thus, the edge control unit 3237 can narrow the to-be-illuminated region and increase the light intensity in a manner of causing the light source 2200 to emit the same luminous energy as luminous energy to be emitted when the edge control unit 3237 controls none of the to-be-illuminated region and the light intensity.

In this example, the edge control unit 3237 causes the 8 pixels near the center of the line of the 16 pixels of the 4,800-dpi image data to emit light, and lights off the other 8 pixels near the edge of the line. By performing control in this manner, the edge control unit 3237 can narrow the to-be-illuminated region from an outer side toward the center of the line.

Figure 16:
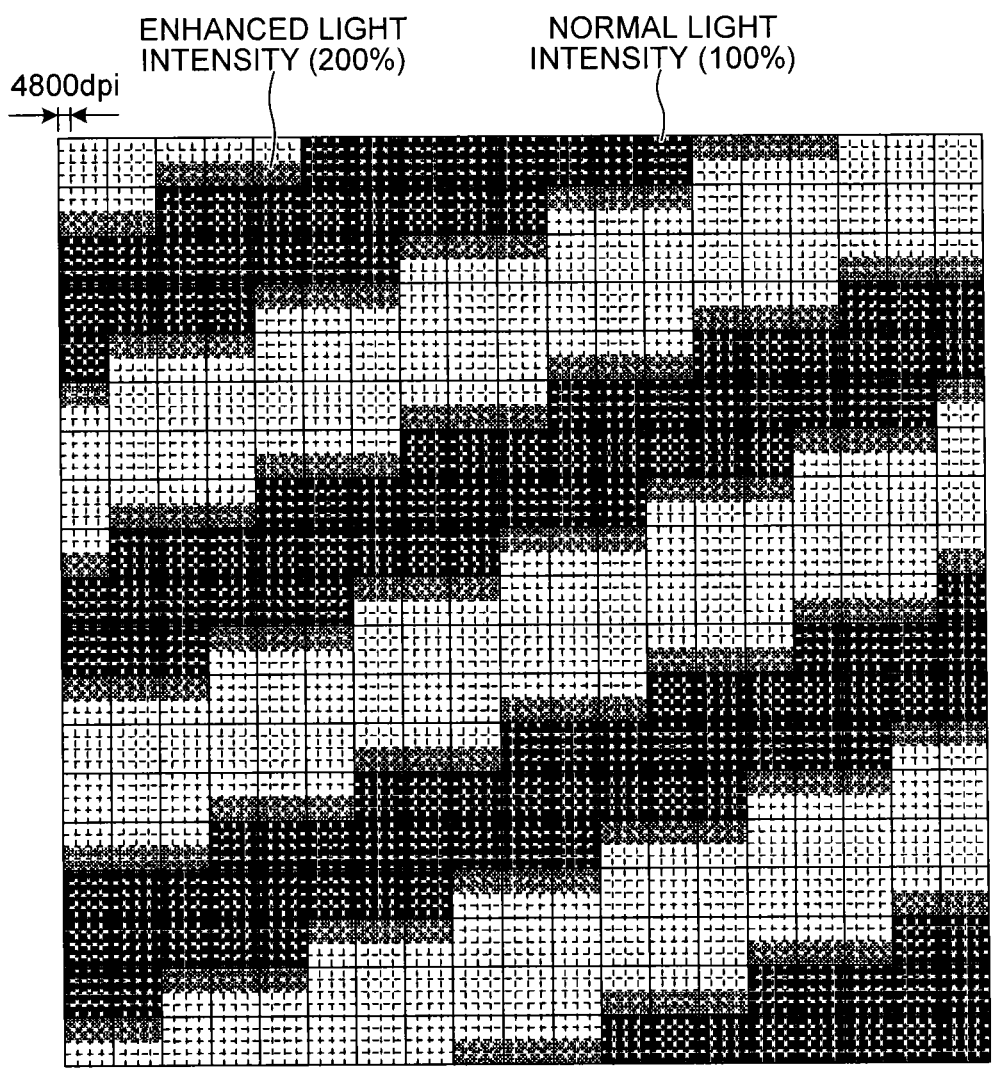
FIG. 16 is a diagram of a portion of a parallel-line pattern of 4,800-dpi image data obtained by increasing resolution of and performing edge processing on the parallel-line pattern illustrated in FIG. 13.

FIG. 16 is a diagram of a portion of a parallel-line pattern of 4,800-dpi image data obtained by increasing the resolution of and performing the edge processing on the parallel-line pattern illustrated in FIG. 13. As described above, the edge control unit 3237 narrows a to-be-illuminated region of an edge neighborhood, and causes the edge neighborhood to emit light at the enhanced light intensity higher than the normal light intensity when the resolution conversion of increasing the resolution of a parallel-line pattern from the first resolution (1,200 dpi) to the second resolution (4,800 dpi) is performed.

By performing control in this manner, the drive control unit 3103 can cause electric field intensity to increase or decrease sharply at an edge portion of an electrostatic latent image formed on the photosensitive drum 2030. If the electric field intensity of the edge portion increases or decreases sharply, no weak electric-field region, to which toner sticks less reliably, will be produced. By making a boundary between a portion, to which toner is to stick, and a portion, to which toner is not to stick, of each of the lines on the electrostatic latent image clear and distinct in this manner, the drive control unit 3103 prevents such an undesirable condition that toner sticks unevenly or that toner is scattered between the lines. As a result, the color printer 2000 can print parallel-line patterns with uniform gray levels.

First Modification

A first modification of the embodiment is described below. The first modification is substantially similar in function and configuration to the embodiment described above with reference to FIGS. 1 to 16. Accordingly, like reference symbols designate elements identical or corresponding in function and configuration to those in FIGS. 1 to 16, for which reason repeated description is omitted below.

Figure 17:
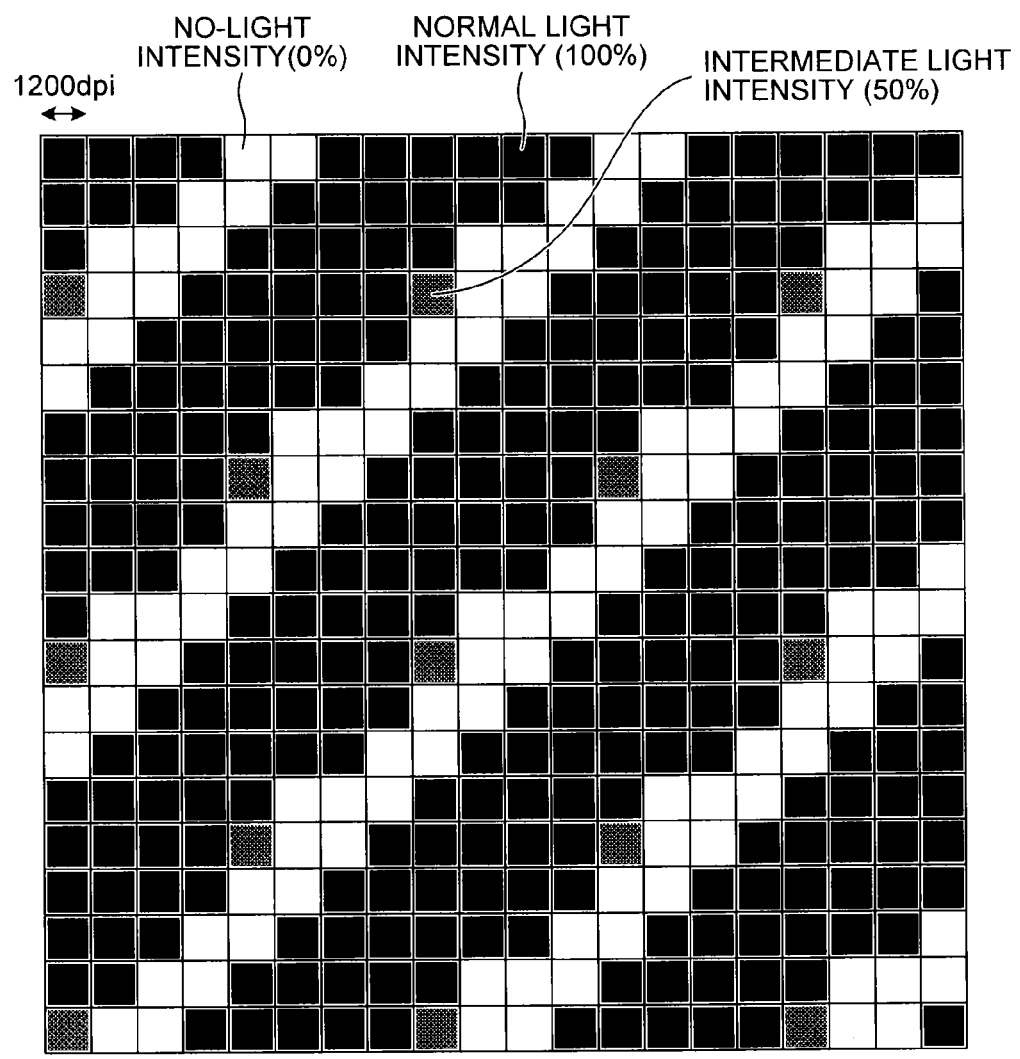
FIG. 17 is a diagram of a portion of a parallel-line pattern of 1,200-dpi image data represented with three levels of light intensity.

FIG. 17 is a diagram of a portion of a parallel-line pattern of 1,200-dpi image data represented with three levels of light intensity. The digital half-toning unit 3224 according to the first modification forms a parallel-line pattern with pixels of three gray levels. The digital half-toning unit 3224 forms such a parallel-line pattern as that illustrated FIG. 17 of the first resolution (1,200 dpi) with three gray levels which are the no-light intensity (0%), intermediate light intensity (50%), and the normal light intensity (100%).

The lines are formed with pixels (black in FIG. 17) which cause the light source 2200 to emit light at the normal light intensity (100%) and pixels (crosshatched in FIG. 17) which cause the light source 2200 to emit light at the intermediate light intensity (50%). Gaps between the lines are filled with pixels (white in FIG. 17) which set the light source 2200 to the no-light intensity (0%).

Figure 18:
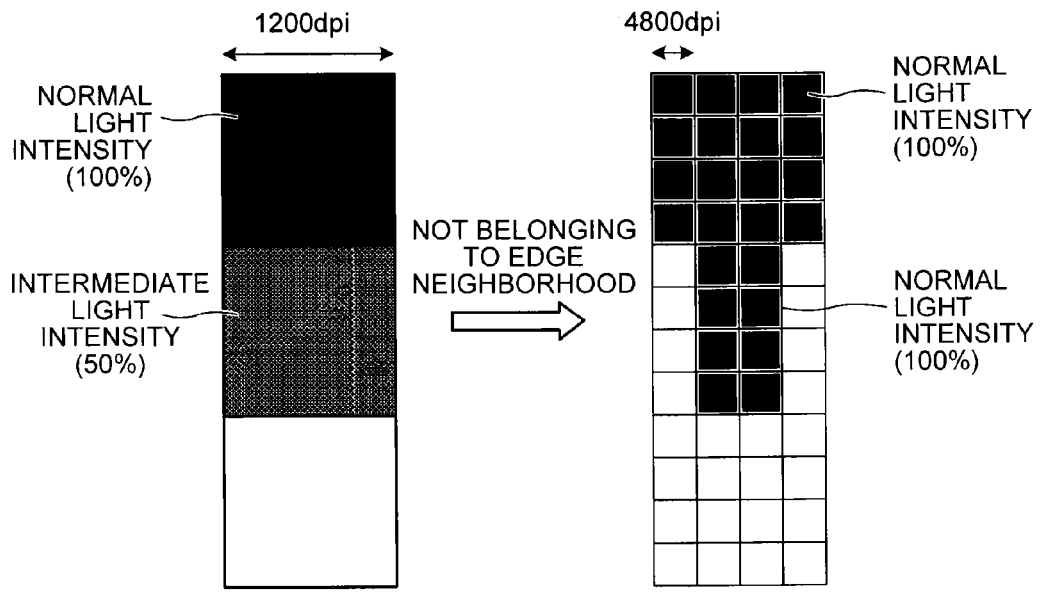
FIG. 18 is a diagram illustrating resolution conversion performed on pixels not belonging to any edge neighborhood in image data represented with three levels of light intensity.

FIG. 18 is a diagram illustrating resolution conversion performed on pixels not belonging to any edge neighborhood in image data represented with the three levels of light intensity. In a case where a pixel not belonging to any edge neighborhood in 1,200-dpi image data represents the normal light intensity (100%), the resolution converting unit 3231 assigns a value representing the normal light intensity (100%) to corresponding 16 pixels of 4,800-dpi image data. In a case where a pixel not belonging to any edge neighborhood in 1,200-dpi image data represents the intermediate light intensity (50%), the resolution converting unit 3231 causes two vertical center rows (8 pixels) of corresponding 16 pixels of 4,800-dpi image data to emit light at the normal light intensity (100%), and lights off the remainder (8 pixels of vertical rows on the outer sides) of the 16 pixels.

By performing control in this manner, the resolution converting unit 3231 can keep the light intensity invariant before and after the resolution conversion.

Figure 19:
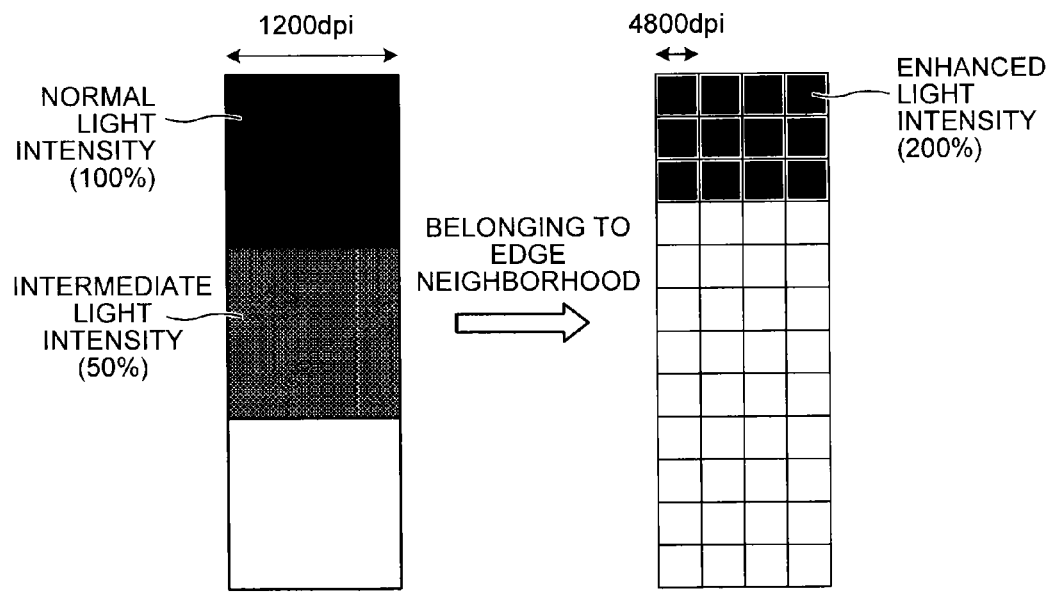
FIG. 19 is a diagram illustrating resolution conversion performed on pixels in an edge neighborhood in image data represented with three levels of light intensity.

FIG. 19 is a diagram illustrating resolution conversion performed on pixels in an edge neighborhood in image data represented with the three levels of light intensity. In a case where two pixels, which are a pixel representing the normal light intensity (100%) and a pixel representing the intermediate light intensity (50%), of the 1,200-dpi image data are adjacent to each other in an edge neighborhood, the edge control unit 3237 converts these two pixels together at a time as illustrated in FIG. 19.

More specifically, in this case, the edge control unit 3237 causes some of corresponding 32 pixels of 4,800-dpi image data to emit light at the enhanced light intensity (200%), and lights off the remainder of the 32 pixels. For example, the edge control unit 3237 may cause 12 pixels, which are on the side of the center of the line, of the 32 pixels of the 4,800-dpi image data to emit light at the enhanced light intensity (200%), and sets the other 20 pixels to the no-light intensity (0%).

By performing control in this manner, the edge control unit 3237 can narrow the to-be-illuminated region and increase the light intensity in a manner of causing the light source 2200 to emit the same luminous energy as luminous energy to be emitted when the edge control unit 3237 controls none of the to-be-illuminated region and the light intensity, also in a case where the parallel-line pattern is represented with three levels of light intensity.

Figure 20:
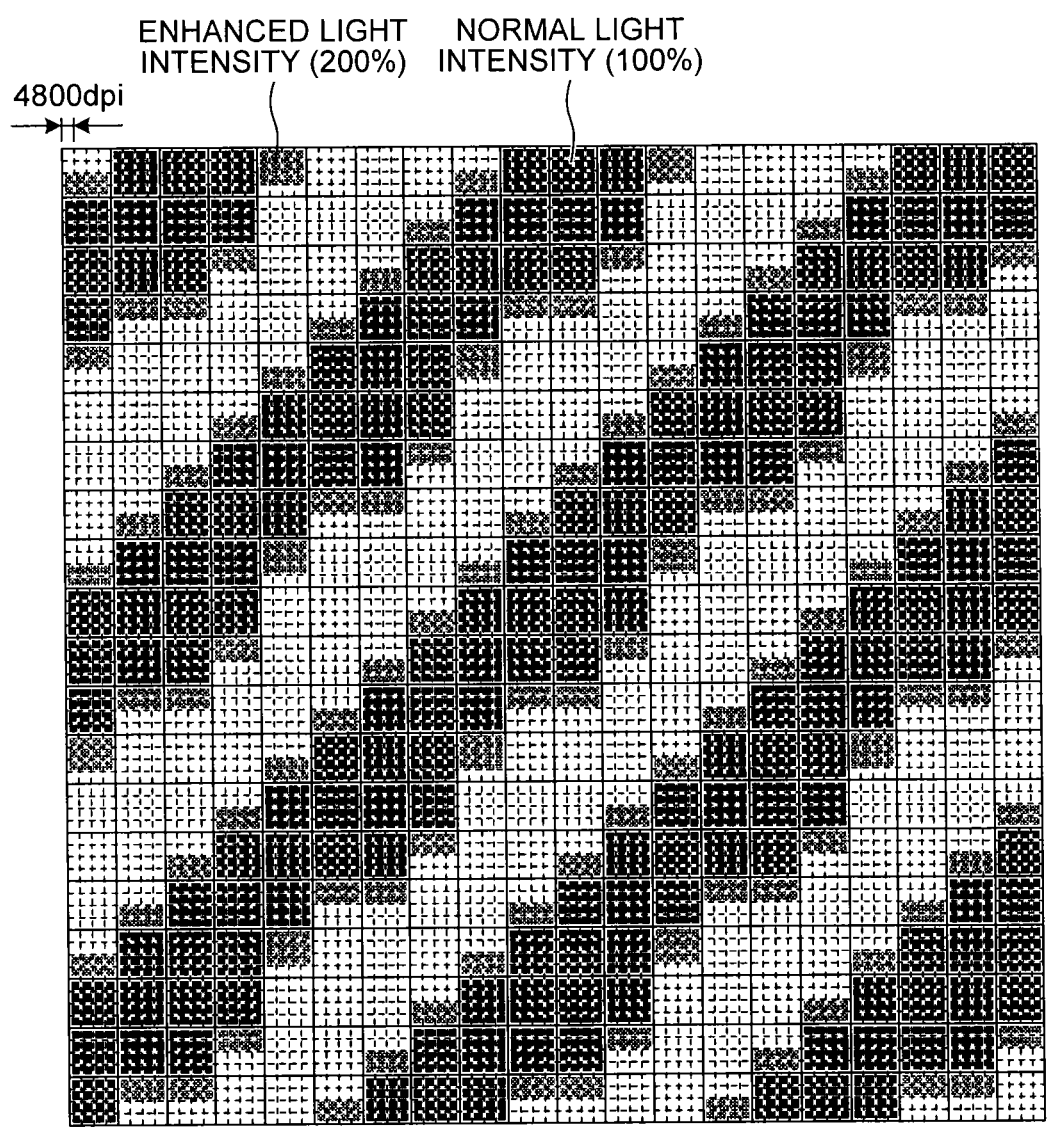
FIG. 20 is a diagram of a portion of a parallel-line pattern of 4,800-dpi image data obtained by increasing resolution of and performing edge processing on the parallel-line pattern illustrated in FIG. 17.

FIG. 20 is a diagram of a portion of a parallel-line pattern of 4,800-dpi image data obtained by increasing the resolution of and performing the edge processing on the parallel-line pattern illustrated in FIG. 17. The drive control unit 3103 according to the first modification can narrow a to-be-illuminated region of an edge neighborhood and cause the edge neighborhood to emit light at the enhanced light intensity higher than the normal light intensity when the resolution conversion of increasing the resolution of a parallel-line pattern from the first resolution (1,200 dpi) to the second resolution (4,800 dpi) is performed, also in a case where the parallel-line pattern is represented with three levels of light intensity.

Second Modification

A second modification of the embodiment is described below. The second modification is substantially similar in function and configuration to the embodiment described above with reference to FIGS. 1 to 16. Accordingly, like reference symbols designate elements identical or corresponding in function and configuration to those in FIGS. 1 to 16, for which reason repeated description is omitted below.

Figure 21:
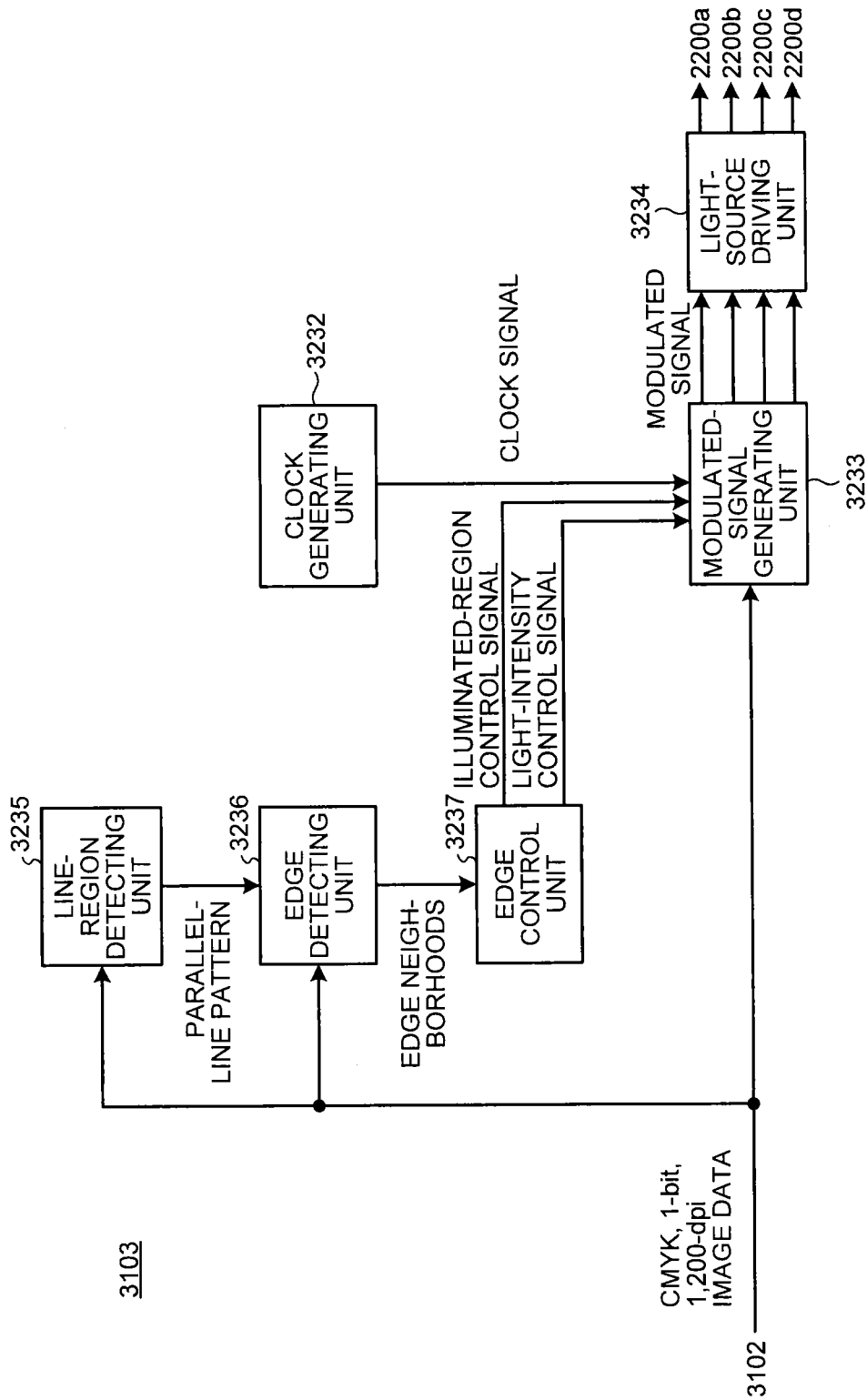
FIG. 21 is a diagram of a configuration of the drive control unit according to a second modification of the embodiment.

FIG. 21 is a diagram of a configuration of the drive control unit 3103 according to the second modification of the embodiment. The drive control unit 3103 according to the second modification does not include the resolution converting unit 3231. The modulated-signal generating unit 3233 according to the second modification receives, for example, CMYK, 1-bit, 1,200-dpi image data from the image processing unit 3102.

The edge control unit 3237 supplies an illuminated-region control signal to the modulated-signal generating unit 3233, thereby narrowing a to-be-illuminated region in an edge neighborhood. More specifically, the edge control unit 3237 narrows the to-be-illuminated region by setting a light-on period of pixels in the edge neighborhood shorter than a light-on period of pixels in other region. For example, the edge control unit 3237 may narrow a to-be-illuminated region while increasing the light intensity by doubling the light intensity of pixels in an edge neighborhood and halving a light-on period of the pixels.

Figure 22:
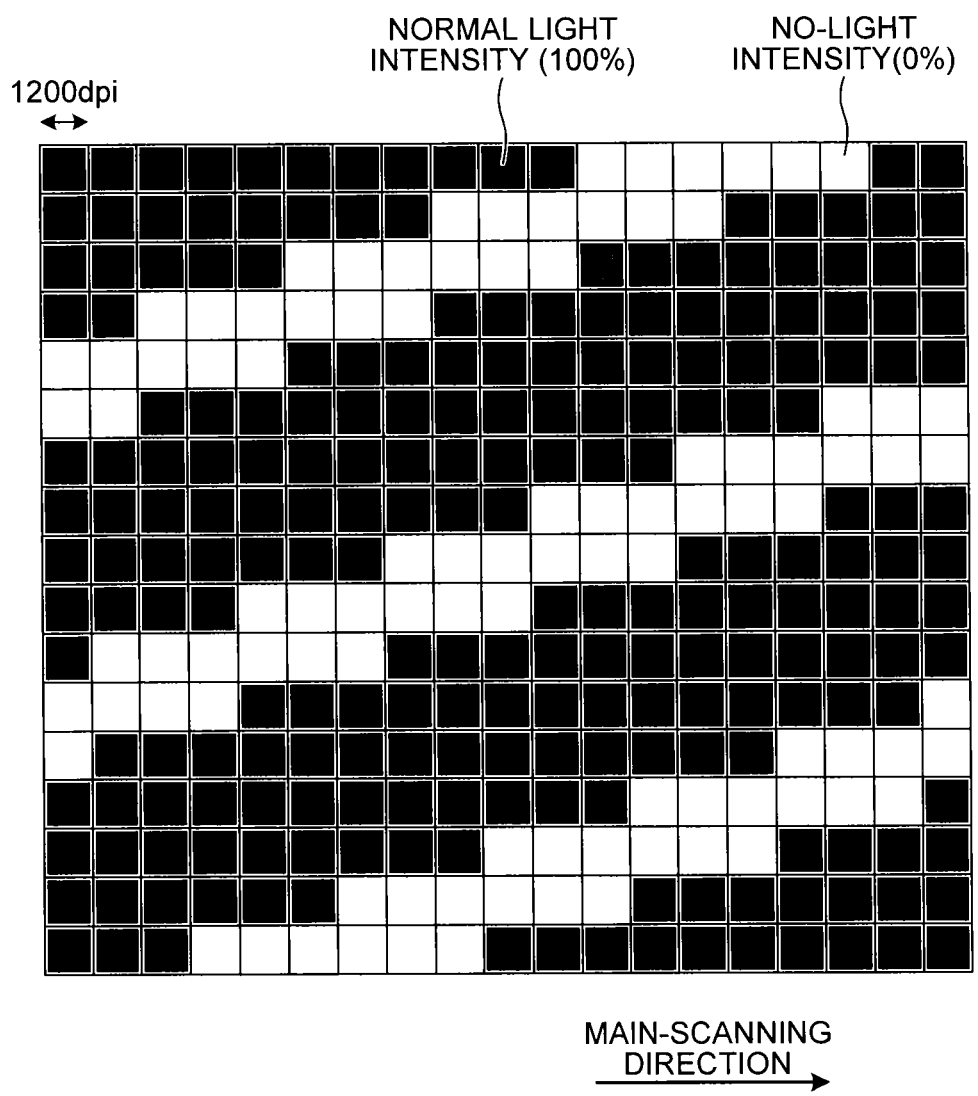
FIG. 22 is a diagram of a portion of a parallel-line pattern of 1,200-dpi image data to be fed to the drive control unit according to the second modification.

FIG. 22 is a diagram of a portion of a parallel-line pattern of 1,200-dpi image data to be fed to the drive control unit 3103 according to the second modification. The drive control unit 3103 receives such 1,200-dpi image data as that illustrated in FIG. 22 represented with pixel values of two gray levels, which are the normal light intensity (100%) and the no-light intensity (0%), from the image processing unit 3102.

Figure 23:
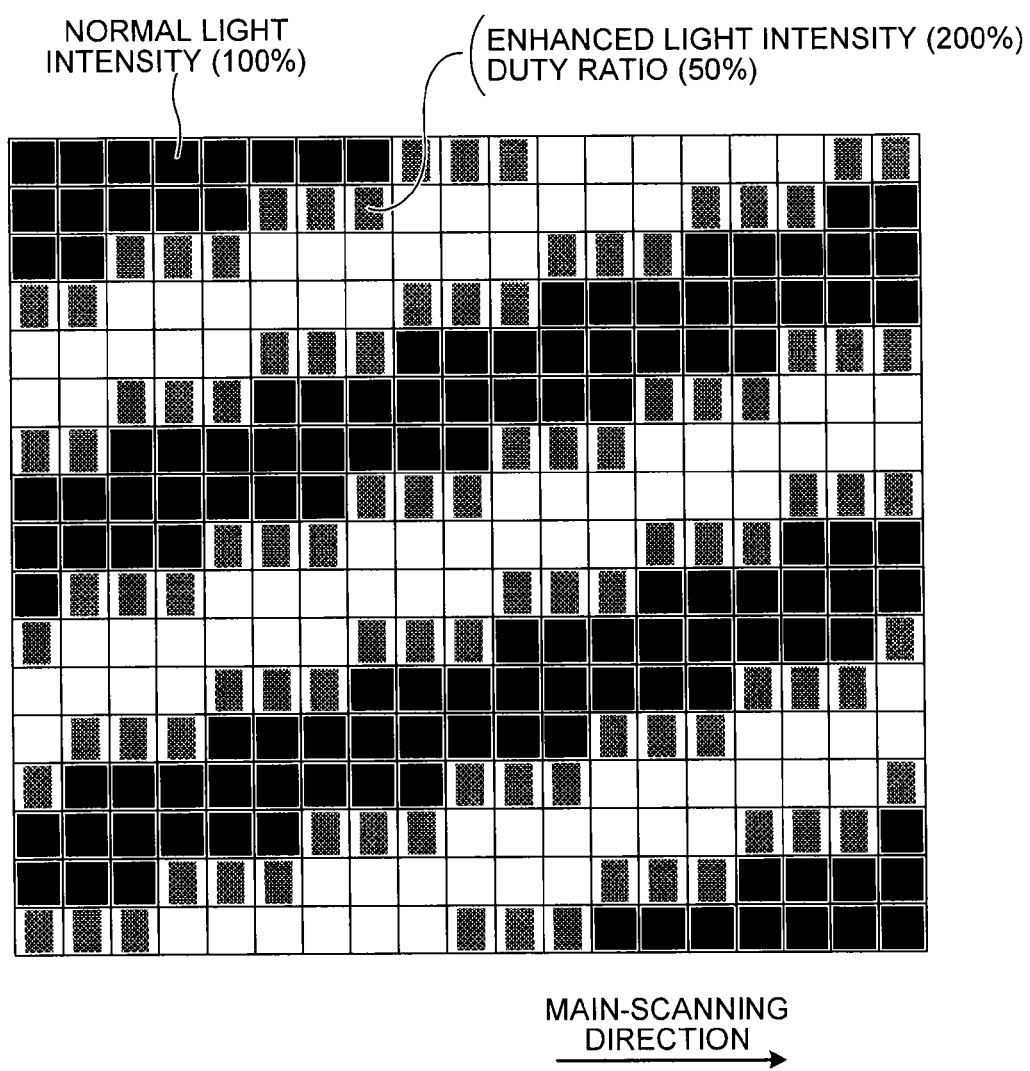
FIG. 23 is a diagram of a portion of a parallel-line pattern of 4,800-dpi image data obtained by the drive control unit according to the second modification of the embodiment by performing edge processing on the parallel-line pattern illustrated in FIG. 22.

FIG. 23 is a diagram of a portion of a parallel-line pattern of 4,800-dpi image data obtained by the drive control unit 3103 according to the second modification by performing edge processing on the parallel-line pattern illustrated in FIG. 22.

The edge control unit 3237 sets the light intensity of pixels in edge neighborhoods of lines to the enhanced light intensity (200%) while halves the light-on period of the pixels (i.e., setting a duty ratio to 50%). By performing control in this manner, the edge control unit 3237 can narrow a to-be-illuminated range of the pixels in the edge neighborhoods in the main-scanning direction.

The drive control unit 3103 according to the second modification configured as described above can narrow the to-be-illuminated range by controlling the light-on period of the light source 2200. Accordingly, the second modification allows narrowing the to-be-illuminated range while increasing the resolution in the main-scanning direction without using the resolution converting unit 3231.

Third Modification

A third modification of the embodiment is described below. The third modification is substantially similar in function and configuration to the embodiment described above with reference to FIGS. 1 to 16. Accordingly, like reference symbols designate elements identical or corresponding in function and configuration to those in FIGS. 1 to 16, for which reason repeated description is omitted below.

Figure 24:
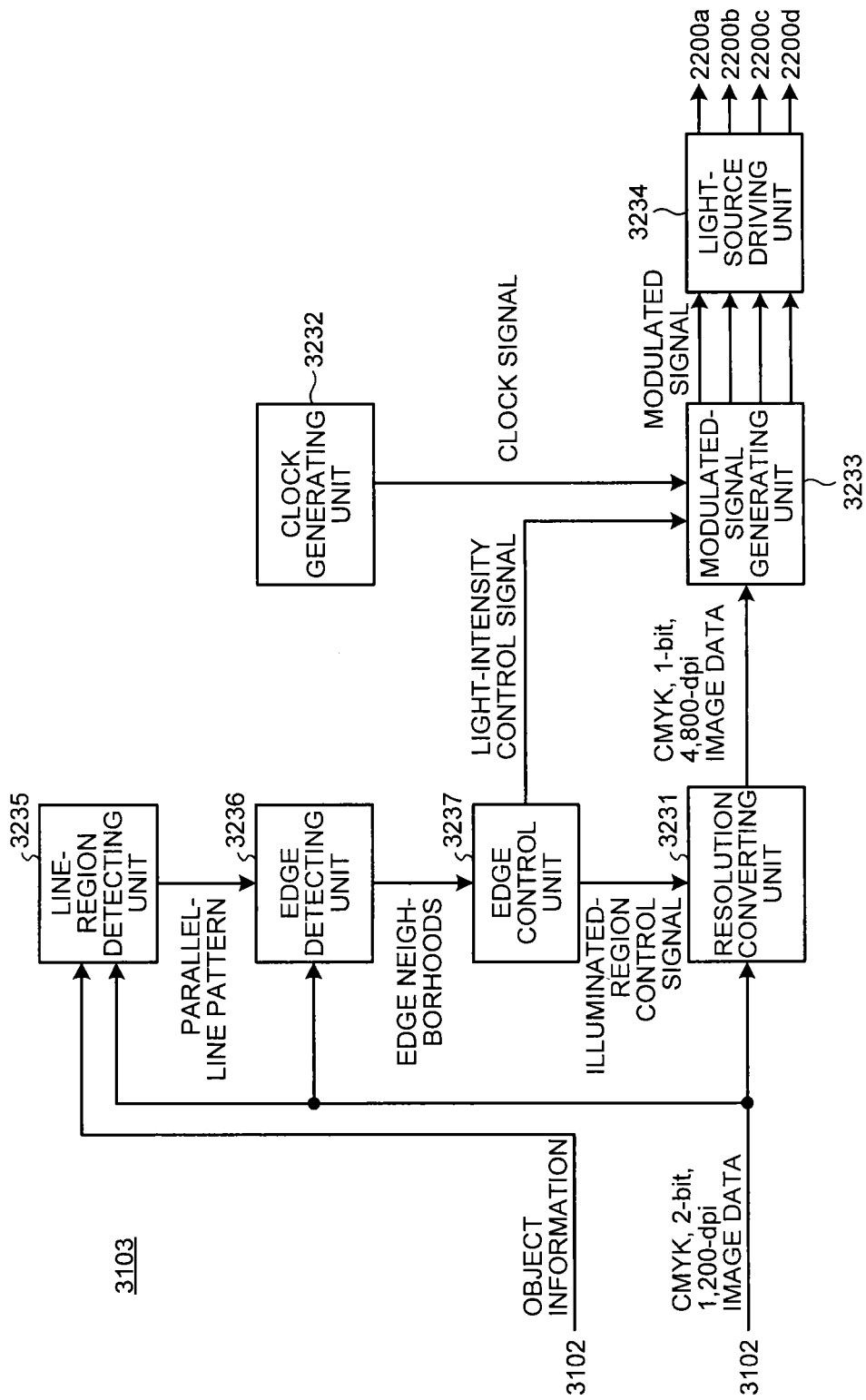
FIG. 24 is a diagram of a configuration of the drive control unit according to a third modification of the embodiment.

FIG. 24 is a diagram of a configuration of the drive control unit 3103 according to the third modification of the embodiment. The line-region detecting unit 3235 according to the third modification receives not only image data but also object information from the image processing unit 3102. The object information specifies, on a per-region basis (e.g., on a per-pixel basis) of the image data, a type of an object represented by pixel(s) in the region.

For instance, if a pixel(s) of the region represents a part of a text, object information indicates a "text" attribute. For another instance, if the pixel(s) represents a part of a graphic shape, object information indicates a "graphic shape" attribute. For another instance, if the pixel(s) represents a part of a photo, object information indicates a "photo" attribute.

The line-region detecting unit 3235 detects parallel-line patterns based on the object information fed from the image processing unit 3102. For instance, the line-region detecting unit 3235 performs parallel-line pattern detection on a region, of which attribute is "photo" according to the object information and therefore to which parallel-line dithering can be applied. By contrast, the line-region detecting unit 3235 does not perform parallel-line pattern detection on a region, of which attribute is "text" or "graphic shape" according to the object information and therefore to which parallel-line dithering will never be applied. By performing detection in this manner, the line-region detecting unit 3235 can detect parallel-line patterns efficiently and accurately.

The edge control unit 3237 may detect the number of lines per unit length or a density of the plurality of lines constituting the parallel-line pattern. For example, the edge control unit 3237 may detect the number of lines per unit length or the density of the plurality of lines by pattern matching. Alternatively, the edge control unit 3237 may detect the number of lines per unit length or the density of the plurality of lines by acquiring information about the number of lines per unit length or information about the density of the parallel-line pattern from the image processing unit 3102.

When this configuration is employed, the edge control unit 3237 may preferably stop changing a to-be-illuminated region and light intensity of an edge neighborhood if the number of lines per unit length or the density is smaller than a preset value.

In a case where electrostatic latent images of lines formed on the photosensitive drum 2030 are close to each other, electric field intensity or the like can be instable due to an influence exerted by an electrostatic latent image of an adjacent line. However, if adjacent lines are away from each other by a certain distance or more, the magnitude of an influence exerted onto an electrostatic latent image of a line by an electrostatic latent image of a line adjacent thereto is small. For this reason, in a case where the number of lines per unit length or the density of lines is smaller than a preset value, an undesirable condition that toner sticks unevenly or that toner is scattered between the lines will not occur. Accordingly, in a case where such an undesirable condition that toner sticks unevenly or that toner is scattered between the lines will not occur, the edge control unit 3237 can stop changing the to-be-illuminated region and the light intensity, thereby reducing the amount of operations to be performed.

According to an aspect of the present invention, an image with a parallel-line pattern can be formed with uniform gray levels.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus for forming an image in accordance with light caused to be emitted from a light source, the image forming apparatus comprising:
 a digital half-toning unit configured to convert a uniform-pixel-value region formed with pixels having a same pixel value of image data to a parallel-line pattern formed with a plurality of parallel lines extending obliquely with respect to a direction, in which pixels are arrayed, thereby expressing each gray level of the image data as an area percentage;
 a modulated-signal generating unit configured to generate a modulated signal by modulating the image data, in which each gray level is expressed as an area percentage, with a clock signal;
 a light-source driving unit configured to drive the light source according to the modulated signal; and
 an edge control unit configured to narrow a to-be-illuminated region, the to-be-illuminated region being to be illuminated by light to be emitted from the light source, in each of edge neighborhoods of the plurality of lines constituting the parallel-line pattern while increasing intensity of the light to be emitted from the light source.

2. The image forming apparatus according to claim 1, wherein the digital half-toning unit converts the uniform-pixel-value region to a parallel-line pattern formed with a plurality of lines of which area percentage depends on the pixel value.

3. The image forming apparatus according to claim 1, wherein the edge control unit narrows the to-be-illuminated region and increases the light intensity in a manner of causing the light source to emit same luminous energy as luminous energy to be emitted when the edge control unit controls none of the to-be-illuminated region and the light intensity.

4. The image forming apparatus according to claim 1, wherein the edge control unit narrows the to-be-illuminated region from an outer side toward a center of the line.

5. The image forming apparatus according to claim 1, wherein the edge control unit narrows the to-be-illuminated region by setting a light-on period of pixels belonging to the edge neighborhood shorter than a light-on period of pixels belonging to other region.

6. The image forming apparatus according to claim 1, further comprising a resolution converting unit, wherein
 the digital half-toning unit outputs image data of a first resolution, and
 the resolution converting unit converts the image data of the first resolution into image data of a second resolution, the second resolution being higher than the first resolution.

7. The image forming apparatus according to claim 6, further comprising:
 a line-region detecting unit configured to detect the parallel line pattern from the image data of the first resolution; and
 an edge detecting unit configured to detect the edge neighborhood of each of the plurality of lines constituting the parallel line pattern by pattern matching.

8. The image forming apparatus according to claim 7, wherein the line-region detecting unit obtains, for each region of the image data of the first resolution, object information specifying a type of an object represented by pixels in the region, and detects the parallel-line pattern based on the obtained object information.

9. The image forming apparatus according to claim 1, wherein when number of the plurality of lines per unit length or density of the plurality of lines is smaller than a preset value, the edge control unit stops changing the to-be-illuminated region and the light intensity in the edge neighborhood.

10. The image forming apparatus according to claim 1, wherein the light source is a vertical-cavity surface-emitting laser.

11. An image forming method for forming an image in accordance with light emitted from a light source, the image forming method comprising:
 performing digital half-toning by converting a uniform-pixel-value region of image data to a parallel-line pattern formed with a plurality of parallel lines extending obliquely with respect to a direction, in which pixels are arrayed, thereby expressing each gray level of the image data as an area percentage;
 performing edge control by narrowing a to-be-illuminated region, the to-be-illuminated region being to be illuminated by light to be emitted from the light source, in each of edge neighborhoods of the plurality of lines constituting the parallel-line pattern while increasing intensity of the light to be emitted from the light source;
 generating a modulated signal by modulating the image data, in which each gray level is expressed as an area percentage, with a clock signal; and
 driving the light source according to the modulated signal.

12. A method for producing a printed product, the method comprising:
 performing digital half-toning by converting a uniform-pixel-value region of image data to a parallel-line pattern formed with a plurality of parallel lines extending obliquely with respect to a direction, in which pixels are arrayed, thereby expressing each gray level of the image data as an area percentage;
 performing edge control by narrowing a to-be-illuminated region, the to-be-illuminated region being to be illuminated by light to be emitted from a light source, in each of edge neighborhoods of the plurality of lines constituting the parallel-line pattern while increasing intensity of the light to be emitted from the light source;
 generating a modulated signal by modulating the image data, in which each gray level is expressed as an area percentage and of which number of gray levels is reduced, with a clock signal;
 forming an electrostatic latent image on a latent-image carrier with light from the light source by driving the light source according to the modulated signal;
 causing toner to stick to the electrostatic latent image formed on the latent-image carrier; and
 transferring the toner onto a medium, thereby producing a printed product.

* * * * *